(12) United States Patent
Chen et al.

(10) Patent No.: US 10,407,123 B2
(45) Date of Patent: Sep. 10, 2019

(54) HYDRAULIC DISC BRAKE DEVICE FOR A BICYCLE

(71) Applicant: GIANT MANUFACTURING CO., LTD., Taichung (TW)

(72) Inventors: I-Teh Chen, Taichung (TW); Hsi Wong, Taichung (TW); Hsien-Chang Kang, Kaohsiung (TW); Wei-Tsung Hsu, Taichung (TW)

(73) Assignee: GIANT MANUFACTURING CO., LTD., Taichung (TW)

( * ) Notice: Subject to any disclaimer, the term of this patent is extended or adjusted under 35 U.S.C. 154(b) by 35 days.

(21) Appl. No.: 15/348,963

(22) Filed: Nov. 10, 2016

(65) Prior Publication Data

US 2017/0137083 A1    May 18, 2017

(30) Foreign Application Priority Data

Nov. 13, 2015   (TW) ............................... 104218283 U
Nov. 3, 2016   (TW) ............................... 105216779 U

(51) Int. Cl.
    *B62L 3/02*        (2006.01)
    *B62K 19/38*      (2006.01)
    *B62K 21/12*      (2006.01)
    *B62K 23/06*      (2006.01)
    *B62K 21/00*      (2006.01)

(52) U.S. Cl.
    CPC .............. *B62L 3/023* (2013.01); *B62K 19/38* (2013.01); *B62K 21/00* (2013.01); *B62K 21/12* (2013.01); *B62K 23/06* (2013.01)

(58) Field of Classification Search
    CPC ........ B62K 19/38; B62K 21/00; B62K 21/12; B62K 23/06; B62L 3/023
    See application file for complete search history.

(56) References Cited

U.S. PATENT DOCUMENTS

| 8,888,066 | B2 | 11/2014 | Moore | |
|---|---|---|---|---|
| 2007/0215417 | A1 | 9/2007 | Chen | |
| 2009/0008198 | A1* | 1/2009 | Jinbo | B60T 11/046 188/344 |
| 2009/0076684 | A1* | 3/2009 | Seidl | B62K 21/00 701/42 |
| 2010/0051400 | A1* | 3/2010 | Yang | B60T 7/102 188/344 |

(Continued)

FOREIGN PATENT DOCUMENTS

| EP | 1908659 A2 | 4/2008 |
|---|---|---|
| JP | 2014237438 A | 12/2014 |

(Continued)

*Primary Examiner* — Vishal R Sahni
(74) *Attorney, Agent, or Firm* — CKC & Partners Co., LLC

(57) ABSTRACT

A hydraulic disc brake device includes a cover, a hydraulic unit, an oil tube and a disc brake unit. The cover includes at least one accommodating space, at least one oil route, a proximal end and a distal end. The distal end towards a moving direction of the bicycle. The hydraulic unit includes a hydraulic cylinder and a piston. The hydraulic cylinder is assembled in the accommodating space. The piston is assembled in the hydraulic cylinder for controlling a pressure of the oil route. The disc brake unit is connected with the oil tube and controlled by a pressure of the oil tube.

7 Claims, 21 Drawing Sheets

(56) References Cited

U.S. PATENT DOCUMENTS

2013/0240313 A1\* 9/2013 Moore .................... B60T 11/16
                                                    188/344
2014/0158487 A1\* 6/2014 Moore ................... B62K 23/06
                                                    188/344
2016/0221632 A1\* 8/2016 Fujiwara ................ B62L 3/023

FOREIGN PATENT DOCUMENTS

| TW | M305797 U   | 2/2007 |
|----|-------------|--------|
| TW | I381974 B   | 1/2013 |
| TW | 201420416 A | 6/2014 |

\* cited by examiner

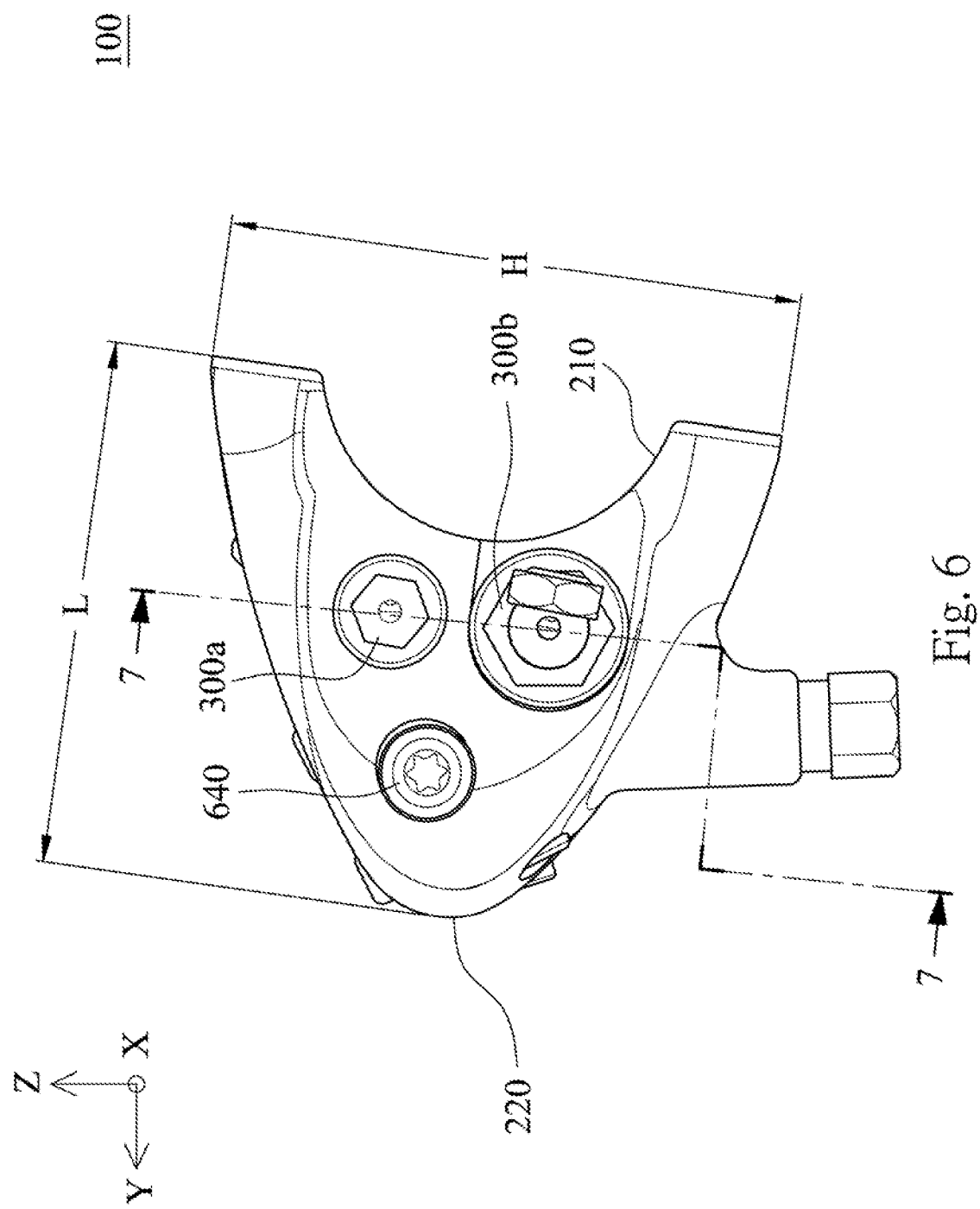

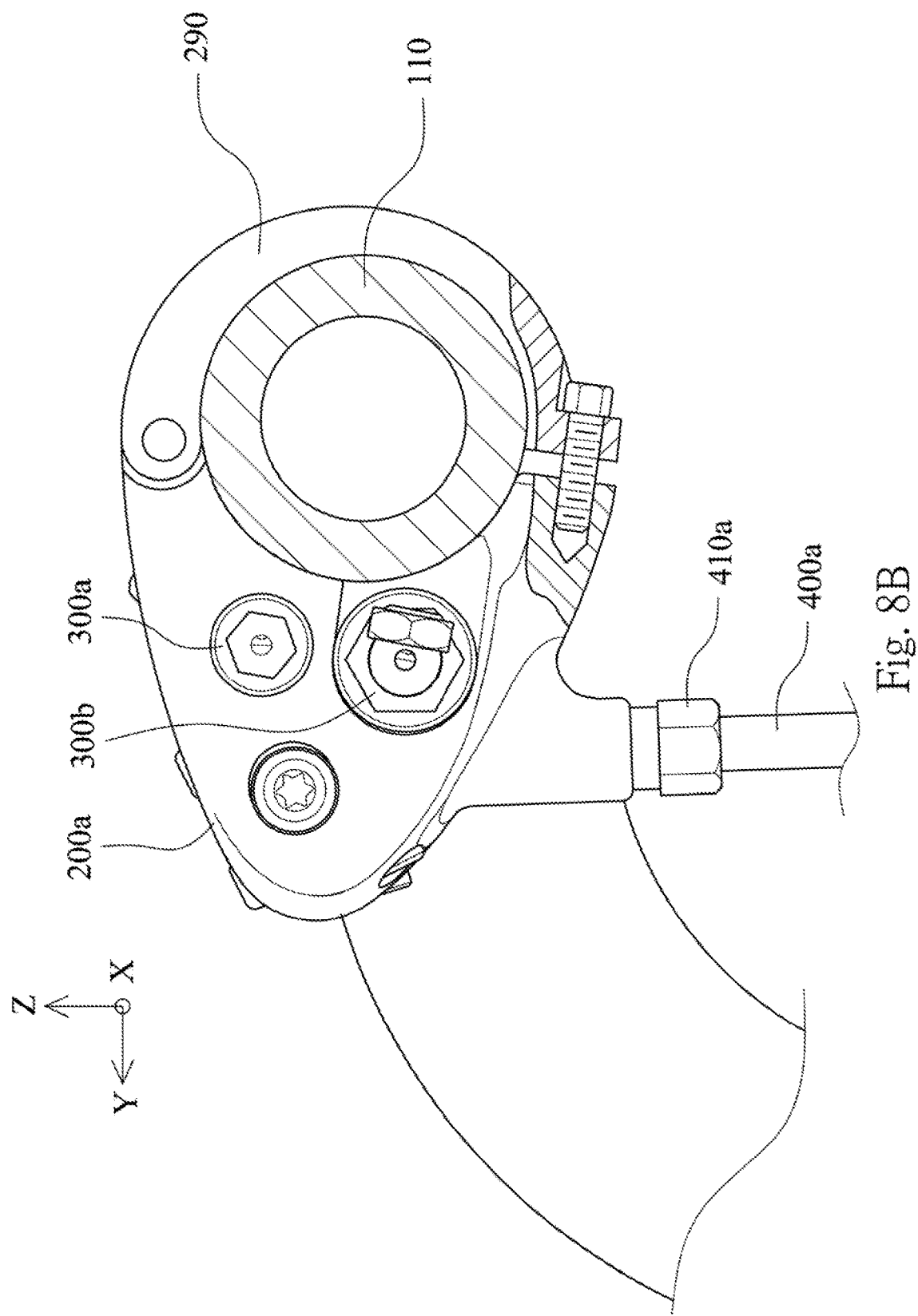

HYDRAULIC DISC BRAKE DEVICE FOR A BICYCLE

RELATED APPLICATIONS

This application claims priority to Taiwan Application Serial Number 104218283, filed Nov. 13, 2015 and Taiwan Application Serial Number 105216779 filed Nov. 3, 2016, all of which are herein incorporated by reference.

BACKGROUND

Technical Field

The present disclosure relates to a brake device for a bicycle, especially relates to a hydraulic disc brake device that can be easily repaired and has low-scale windage and smooth wire routing.

Description of Related Art

Bicycles have been becoming widely promoted co-friendly products worldwide. The market of bicycles has been continuously expanded due to its distinguishing features on energy saving, environmental protection and city transportation. In this situation, hydraulic disc brake device for bicycles has been developed to achieve a better brake effect. Compared to the conventional mechanical disc brake device, the hydraulic disc brake device has advantages on high brake strength and efficiency. Therefore, the hydraulic disc brake device has been becoming a typical component of hi-end bicycles.

Two types of hydraulic disc brake devices in the market nowadays. One type is full hydraulic disc brake device; another type is semi hydraulic disc brake device. The full hydraulic disc brake device is commonly equipped in a cycling road bicycle with flat handle bar. If the full hydraulic disc brake device is equipped in a cycling road bicycle with raiser handle bar, the price is commonly expensive and the species tend to be few. Therefore, most of the handle bars use the mechanical disc brake device. Furthermore, if the hydraulic disc brake device is used, the hydraulic mechanism having the pistons should be assembled under the stem, thus a large-scale windage will be produced.

In the semi hydraulic disc brake device, in addition to the disc brake plate and the hydraulic clamp, a hydraulic mechanism should be used to change the oil pressure, and the hydraulic mechanism is controlled by the brake cable. The brake cable is connected with the piston in the hydraulic mechanism, and the pressure is transferred to the hydraulic clamp to resist the rotation of the wheel to perform a brake. However, this kind of hydraulic disc brake device is protruded from the bicycle body, thereby inducing large-scale windage, heavy weight and bad appearance. The semi hydraulic disc brake device can also be assembled in the stem, but the assembling procedure is complicated, and it is not favorable for repairing and replacing new components.

Therefore, there is a need to develop a hydraulic disc brake device that has low-scale windage, smooth wire routing and is easy to repair.

SUMMARY

According to one aspect of the present disclosure, a hydraulic disc brake device for a bicycle is provided. The hydraulic disc brake device is assembled on a handle bar of the bicycle. The hydraulic disc brake device includes a cover, a hydraulic unit, an oil tube and a disc brake. The cover includes at least one accommodating space, at least one oil route, a proximal end, a distal end, wherein the proximal end is detachably assembled on the body tube, and, the distal end towards to a moving direction of the bicycle. The hydraulic unit includes a hydraulic cylinder and a piston. The hydraulic cylinder is assembled in the accommodating space, and the hydraulic cylinder is located in front of a moving direction of the handle bar. The piston is assembled in the hydraulic cylinder for controlling a pressure of the oil route. The oil tube is connected with the oil route. The disc brake unit is connected with the oil tube and controlled by a pressure of the oil tube.

According to another aspect of the present disclosure, a hydraulic disc brake device for a bicycle is provided. The hydraulic disc brake device for a bicycle is assembled on a body tube of the bicycle; the body tube is assembled with a handle bar. The hydraulic disc brake device for a bicycle includes a cover, an oil route, a hydraulic cylinder, a piston an activating member, an oil tube and a disc brake unit. The cover includes a connection portion and an extension portion, wherein the connection portion is detachably connected with the body tube, and an accommodating space is formed in the extension portion. The cover is in front of the handle bar. The oil route is assembled in the accommodating space of the extension portion. The hydraulic cylinder is assembled in the accommodating space of the extension portion. The piston is assembled in the hydraulic cylinder for controlling a pressure of the oil route. The activating member is connected with the piston and activates the piston for performing a brake. The oil tube is connected with the oil route. The disc brake unit is connected with the oil tube and is controlled by pressure of the oil tube.

BRIEF DESCRIPTION OF THE DRAWINGS

The present disclosure can be more fully understood by reading the following detailed description of the embodiment, with reference made to the accompanying drawings as follows:

FIG. 6 is a side view of the hydraulic disc brake device for a bicycle of FIG. 4;

FIG. 8B is a side view of FIG. 8A;

DETAILED DESCRIPTION

It is a purpose of the present disclosure to provide a hydraulic disc brake device that has a simple structure and light weight. The hydraulic disc brake device is assembled in the front of the handle bar or the stem, and is aerodynamically shaped. Therefore, the windage can be dramatically reduced. Furthermore, all of the hydraulic brake components are hidden in the cover, thus the volume and the manufacturing cost of the hydraulic disc brake device can be reduced.

Figure 1:
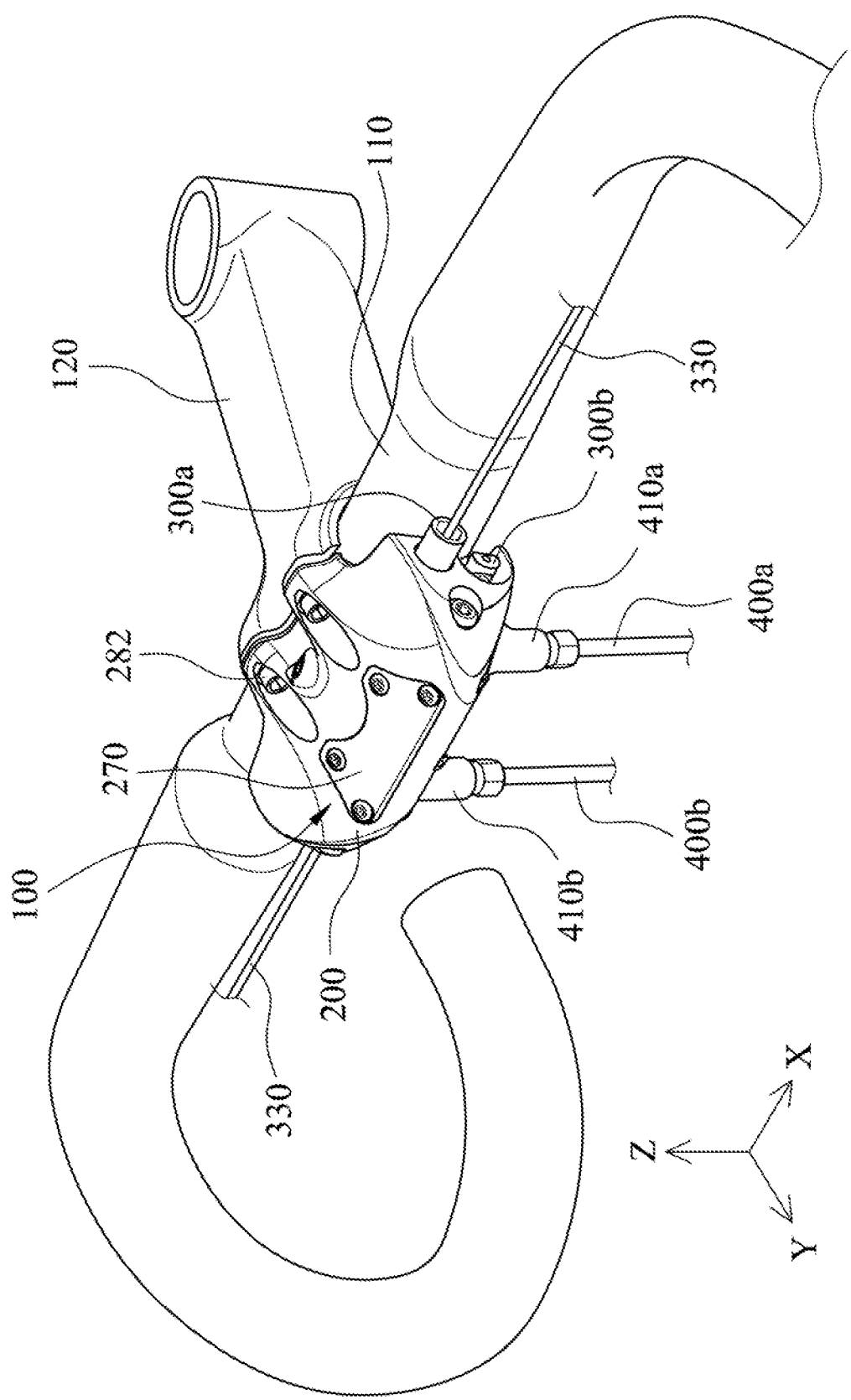
FIG. 1 is a schematic view showing that a hydraulic disc brake device for a bicycle assembled with a stem according to one embodiment of the present disclosure.
Figure 2:
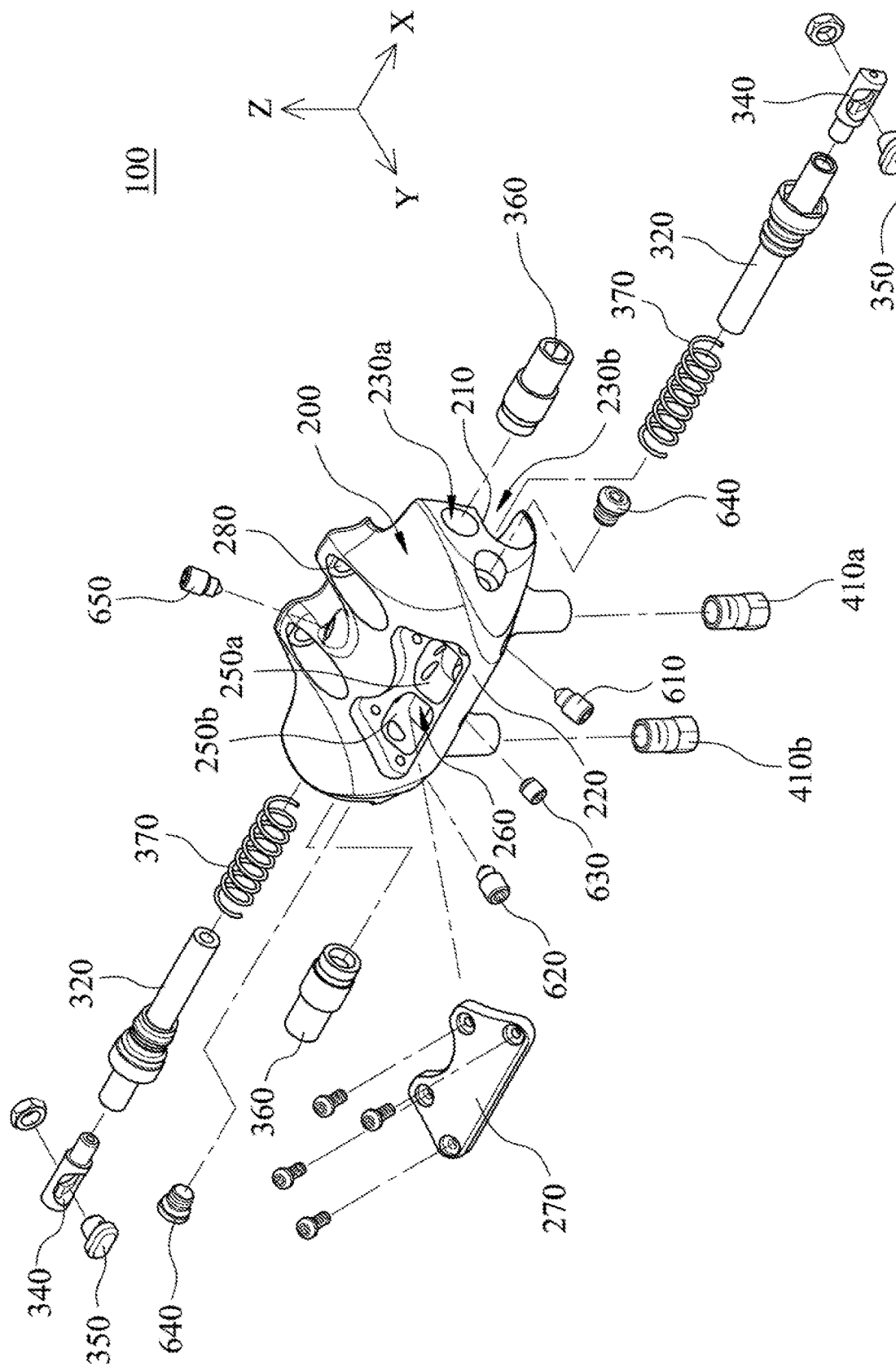
FIG. 2 is an exploded view of the hydraulic disc brake device for a bicycle of FIG. 1.
Figure 3:
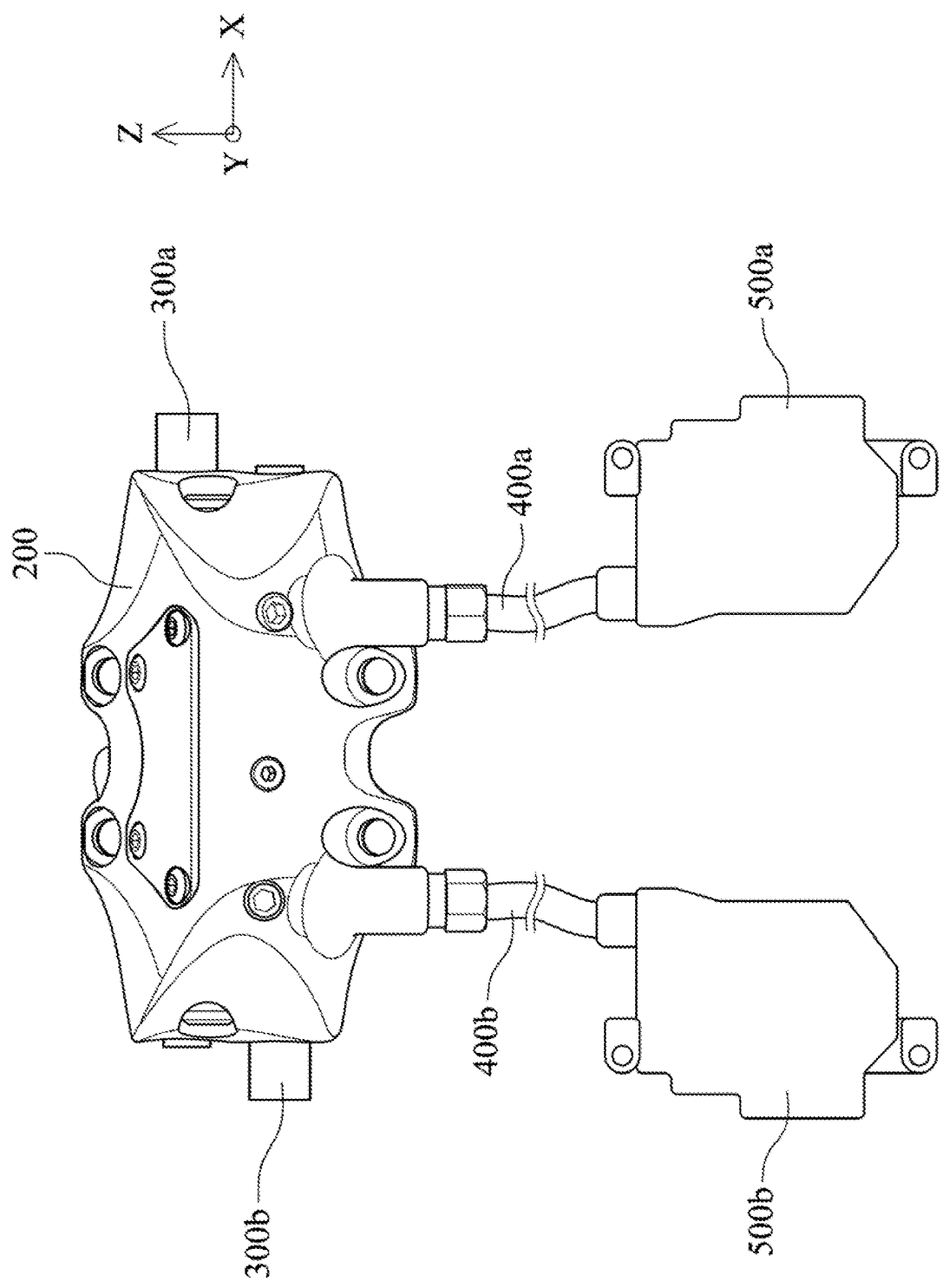
FIG. 3 is a cross-sectional view of the hydraulic disc brake device for a bicycle of FIG. 1.
Figure 4:
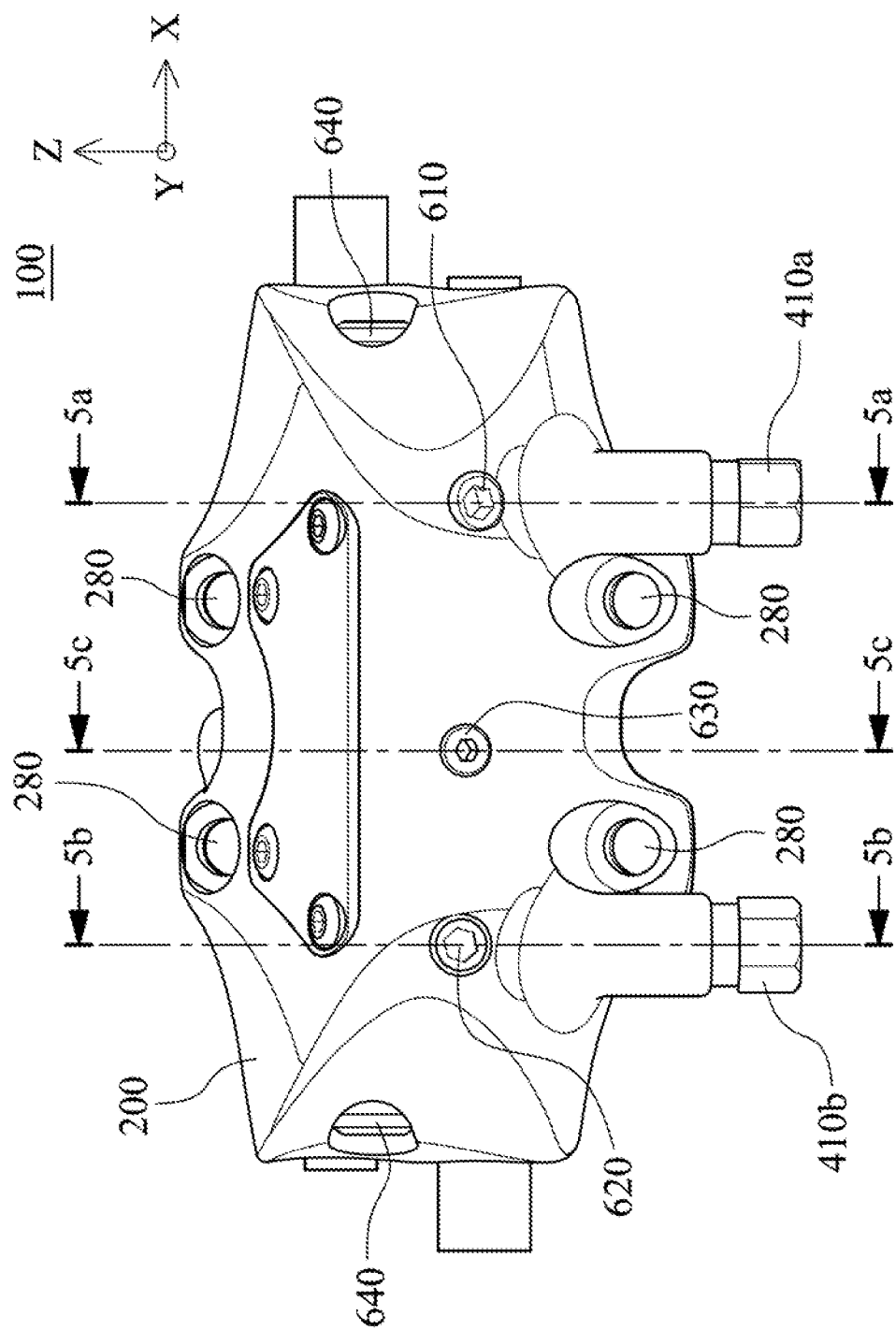
FIG. 4 is a front side view of the hydraulic disc brake device for a bicycle of FIG. 1.
Figure 5B:
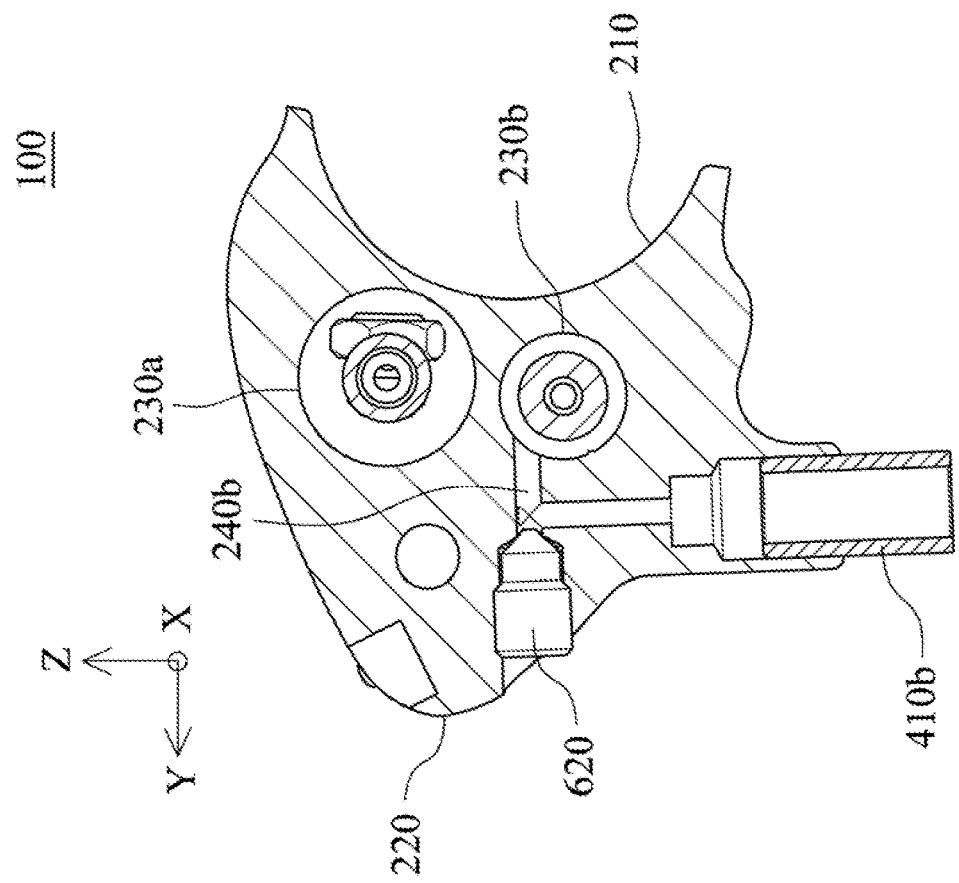
FIG. 5B is a cross-sectional view taken along 5b-5b line of FIG. 4.
Figure 5A:
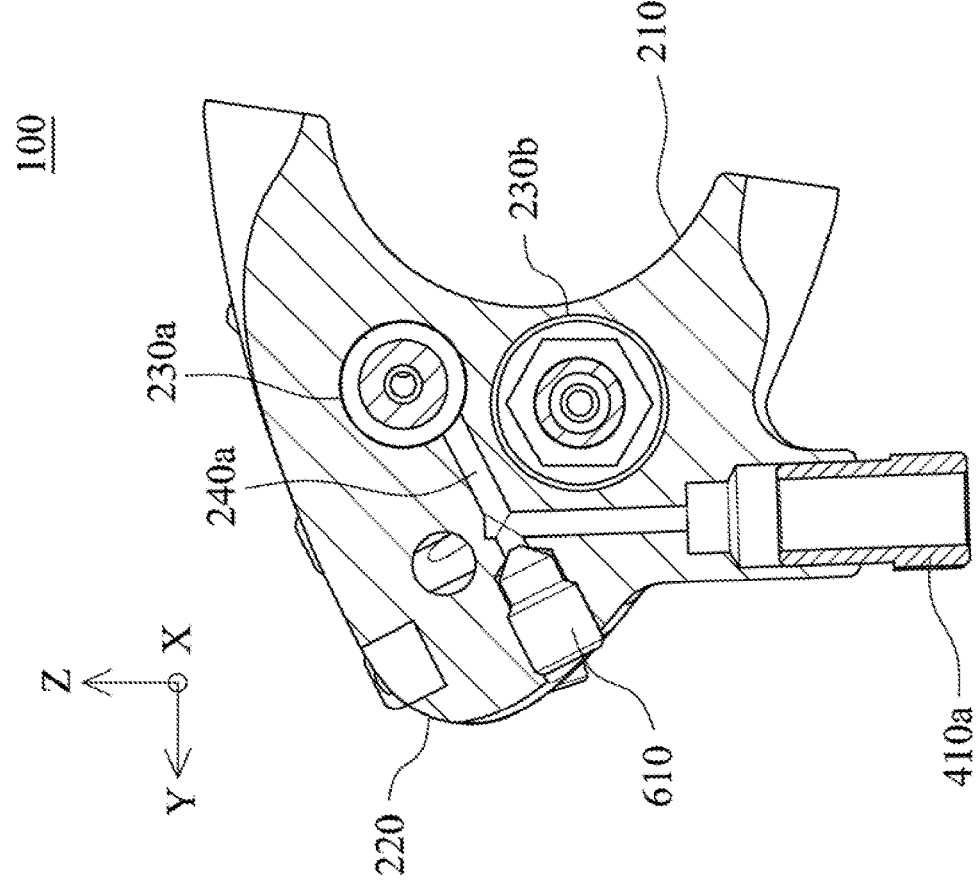
FIG. 5A is a cross-sectional view taken along 5a-5a line of FIG. 4.
Figure 5C:
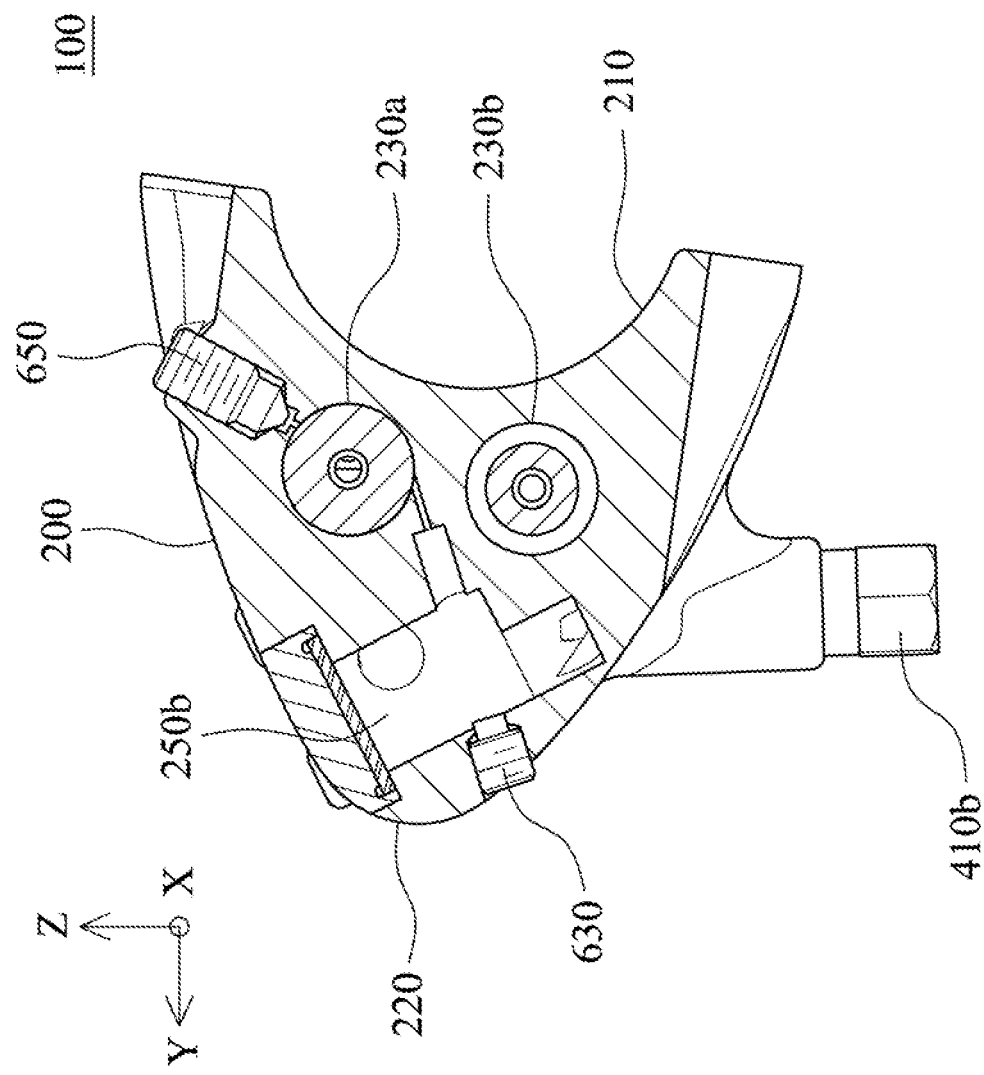
FIG. 5C is a cross-sectional view taken along 5c-5c line of FIG. 4.
Figure 7:
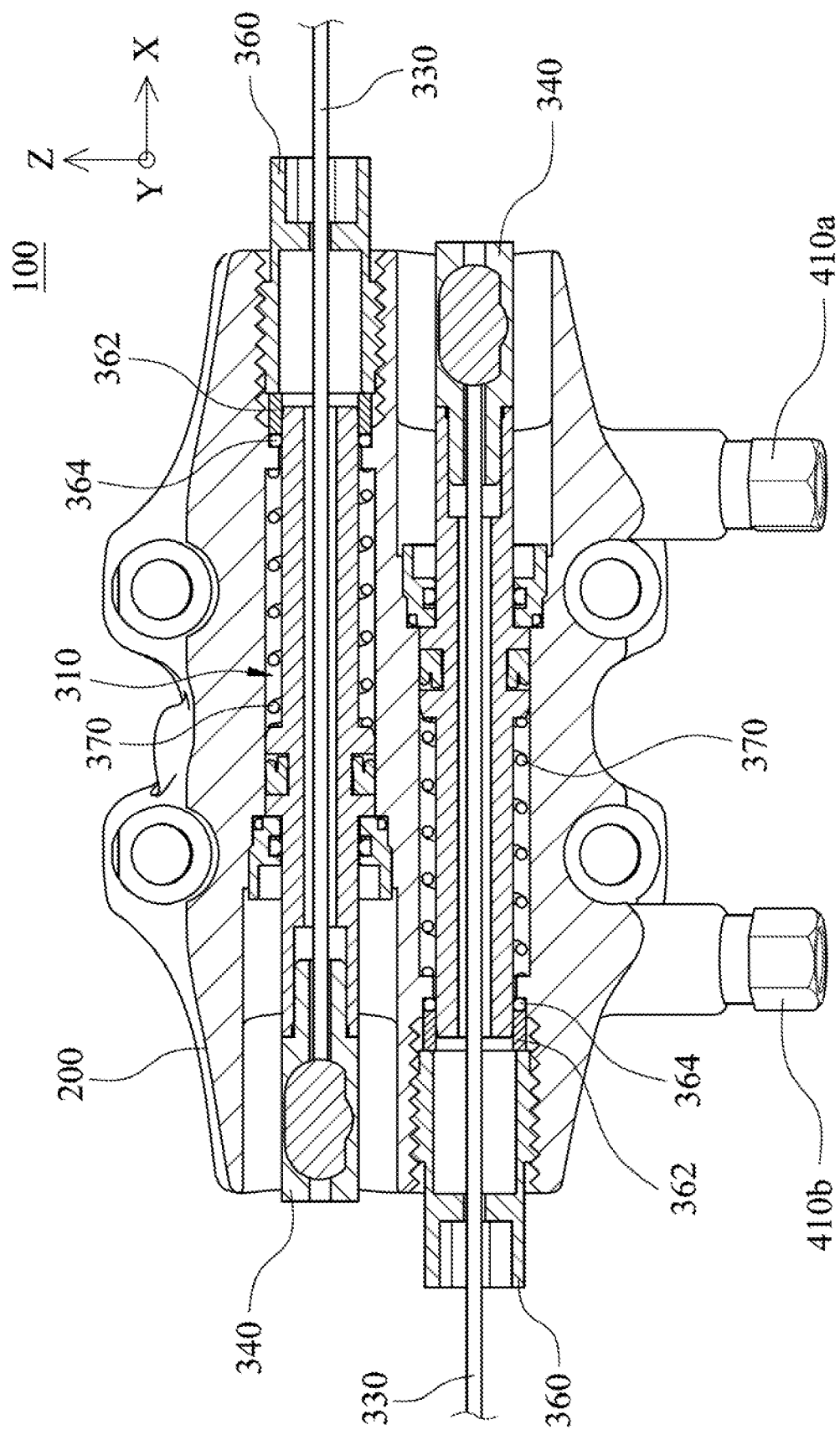
FIG. 7 is a cross-sectional view taken along 7-7 line of FIG. 6.

FIG. 1 is a schematic view showing that a hydraulic disc brake device for a bicycle assembled with a stem according to one embodiment of the present disclosure; FIG. 2 is an exploded view of the hydraulic disc brake device for a bicycle of FIG. 1; FIG. 3 is a cross-sectional view of the hydraulic disc brake device for a bicycle of FIG. 1; FIG. 4 is a front side view of the hydraulic disc brake device for a bicycle of FIG. 1; FIG. 5A is a cross-sectional view taken along 5a-5a line of FIG. 4; FIG. 5B is a cross-sectional view taken along 5b-5b line of FIG. 4; FIG. 5C is a cross-sectional view taken along 5c-5c line of FIG. 4; FIG. 6 is a side view of the hydraulic disc brake device for a bicycle of FIG. 4; FIG. 7 is a cross-sectional view taken along 7-7 line of FIG. 6.

An X-Y-Z coordinate system is used to define the directions in the present disclosure. For example, a positive-X axis direction, a negative-X axis direction, a positive-Y axis direction, a negative-Y axis direction, a positive-Z axis direction and a negative-Z axis direction are used to define the directions. A hydraulic disc brake device 100 for a bicycle is assembled with a body tube 110. In the embodiment, the body tube 110 is a handle bar, and the handle bar is assembled along the X axis direction. The hydraulic disc brake device 100 for a bicycle includes a cover 200; two hydraulic units 300a, 300b; two oil tubes 400a, 400b and two disc brake units 500a, 500b.

The cover 200 is aerodynamically shaped and includes a proximal end 210, a distal end 220, two accommodating spaces 230a, 230b, two oil routes 240a, 240b, two oil sumps 250a, 250b, an oil hole 260, an oil cap 270, a length L and a height H. The proximal end 210 is detachably connected with the body tube 110 through a stem 120, and the proximal end 210 is screwed in the stem 120. A shape of a section of the body tube 110 is the same as a shape of the assembling of the proximal end 210 and one end of the stem 120. Therefore, the body tube 110 can be assembled through the proximal end 210 and the stem 120. The stem 120 is vertically connected with the body tube 110, and the body tube 110, the stem 120 and the proximal end 210 can be tightly assembled. A section of the proximal end 210 and a section of the stem 120 are semi-circles, and a section of the body tube 110 can be a circle or other shape. In the embodiment, the body tube 110 is a handle bar, and a section of the body tube 110 is a circle. The proximal end 210 towards the negative-Y axis direction and the distal end 220 towards the positive-Y axis direction, and the direction which the distal end 220 towards is the same as a moving direction of the bicycle. The proximal end 210 has a maximum height H, the height H is decreased progressively from the proximal end 210 to the distal end 220. The maximum height H of the proximal end 210 is greater or equal to a diameter of the body tube 110 owing to the body tube 110 will be covered and connected after assembling the proximal end 210 to one end of the stem 120. The accommodating space 230a and the accommodating space 230b open two holes outward along the X axis direction respectively. In detail, the accommodating space 230a is cylindrical shaped and through the cover 200, the accommodating space 230a opens two holes, and the two holes are circular shaped. Furthermore, the accommodating spaces 230a, 230b are connected with the oil routes 240a, 240b, and the hydraulic units 300a, 300b are assembled in the accommodating spaces 230a, 230b respectively for controlling a pressure of the oil routes 240a, 240b respectively. It should be mentioned that the accommodating spaces 230a, 230b are assembled in the cover 200 from top to bottom along the Z axis direction. In other word, the accommodating space 230a is located above the accommodating space 230b. In this situation, the length L can be smaller than the height H of the cover 200. Therefore, the volume of the cover 200 can be reduced and is smaller than the conventional art (i.e. the length L is greater than the height H), thus the weight and the manufacturing cost of the cover 200 can be reduced. The position of the accommodating spaces 230a, 230b is close to the proximal end 210 of the cover 200, and the cover is aerodynamically shaped; the windage can be dramatically reduced through the simple structure and the particular shape of the hydraulic disc brake device 100 for a bicycle of the present disclosure. Furthermore, the two oil sumps 250a, 250b are assembled in the cover 200 and are close to the distal end 220. The two oil sumps 250a, 250b are connected with the two hydraulic units 300a, 300b, and the two oil sumps 250a, 250b are corresponding to the oil hole 260. The oil hole 260 is close to the distal end 220 of the cover 200 and towards an upper direction of the distal end 220, in other word, the oil hole 260 towards the positive-Z axis direction. The oil cap 270 detachably covers the oil hole 260, the size and the shape of the oil cap 270 is the same as those of the oil hole 260, thus the oil cap 270 can be tightly screwed to the cover 200 and covers the oil hole 260 for preventing the leakage of the oil in the oil sumps 250a, 250b. In other examples, the oil can be replaced by a fluid with high boiling point and is not easily evaporated.

The height H of the cover 200 is increased progressively from the distal end 220 to the proximal end 210, and the windward surface of the cover 200 is aerodynamically shaped; when the bicycle is moving toward the Y axis direction, the airflow can be naturally passed along the top and bottom sides of the distal end 220, and the proximal end 210 of the cover 200 is connected with the body tube 110 (handle bar), thus the shape of windward surface of the original handle bar is changed to the curved distal end 220. In the situation that the body tube 110 (handle bar) is overlapped along the Y axis direction with the cover 200, the area of the windward surface is not increased, and the windage can be further reduced through the aerodynamically shaped cover 200. The cover 200 includes four positioning holes 280 and four positioning screws 282, and the stem 120 includes four corresponding fixing holes. The four fixing holes are aligned with the four positioning holes 280. Each of the positioning screws 282 can through and move between one of the positioning holes 280 and one of the fixing holes, thus the cover 200 can be screwed to the stem 120 through the four positioning screws 282. The screwing direction of the positioning screw 282 is parallel to the Y axis direction, thus the positioning screw 282 will not face to the windward surface. Furthermore, the quantity of the positioning screw 282 can be four. Two positioning screws 282 are located at the top of the cover 200, and two positioning screws 282 are located at the bottom of the cover 200, therefore, the body tube 110, the cover 200 and the stem 120 can be firmly connected thereby increasing the adaptation.

The two hydraulic units 300a, 300b are both connected with the cover 200 and have the same components. The operation directions of the two hydraulic units 300a, 300b are opposite. Take the hydraulic unit 300a for an example, the hydraulic unit 300a includes a hydraulic cylinder 310, a piston 320, an activating member 330, a wire fixing base 340, a wire fixing member 350, a brake cable tube 360 and a spring 370. The hydraulic cylinder 310 is assembled in the accommodating space 230a and is located in the front end of the body tube 110. In more details, the moving direction of the bicycle towards the positive-Y axis direction, the front end of the body tube 110 also towards the positive-Y axis direction, and the extension direction of the body tube 110 towards the X axis direction. The proximal end 210 of the cover 200 towards the negative-Y axis direction, the distal end 220 of the cover 200 towards the positive-Y direction, and the hydraulic cylinder 310 is located between the proximal end 210 and the distal end 220. From above, it is known that the hydraulic cylinder 310 and the accommodating spaces 230a, 230 b are all located in the front end of the body tube 110, and the accommodating spaces 230a, 230b are located close to the proximal end 210 of the cover 200. Through this kind of structure, the route of the brake cable can be smoothly attached to the body tube 110, thus a wide space can be obtained, and it is favorable for repairing or dismantling. The piston 320 is assembled in the hydraulic cylinder 310, and the piston 320 is used to control a pressure of the oil route 240a. Furthermore, the activating member 330 is a brake cable, the activating member 330 through the hole of the accommodating space 230 and activates the piston 320 for performing a brake. In details, the accommodating space 230a opens two circle holes outward, one of the circle holes is corresponding to the wire fixing base 340 and the wire fixing member 350, the other circle hole is corresponding to the brake cable tube 360. The brake cable tube 360 is connected with one end of a washer 362, and the other end of the washer 362 is connected with a packing ring 364. The washer 362 and the packing ring 364 are all located in the accommodating spaces 230a, 230b for fixing the brake cable tube 360 to the cover 200. One end of the activating member 330 is fixed through the wire fixing base 340 and the wire fixing member 350, and the activating member 330 also through the hole of the accommodating space 230a and a central hole of the brake cable tube 360; the other end of the activating member 330 is extended toward the X axis direction and is along the handle bar of the body tube 110 and is connected with a manual brake device. When performing a brake, the activating member 330 moves toward the positive-X axis direction and activates the piston 320 to compress the spring 370, at the time, the oil in the oil route 240a and the oil sump 250a is pressured and activates the disc brake unit 500a to resist the rotation of the wheel; on the contrary, in a normal situation, the spring 370 resist the piston 320 to release the pressure of the oil in the oil route 240a, thus the wheel can rotate normally. It should be mentioned that the moving direction of the activating member 330 of the hydraulic unit 300b and the moving direction of the activating member 330 of the hydraulic unit 300a are opposite, the activating member 330 of the hydraulic unit 300a is controlled by a manual brake device in a left hand of a user, and the activating member 330 of the hydraulic unit 300b is controlled by a manual brake device in a right hand of a user. The moving direction of the activating member 330 is parallel to the body tube 110, thus it is favorable for wire routing and repairing.

Two oil tubes 400a, 400b are connected with the oil routes 240a, 240b and the oil sumps 250a, 250b respectively. In details, two oil tubes 400a, 400b are connected with the oil routes 240a, 240b through guiding members 410a, 410b. The guiding members 410a, 410b can be embedded to the body tube 200, in the embodiment; the guiding members 410a, 410b are screwed to the body tube, and the guiding members 410a, 410b toward the negative-Y axis direction. The oil tubes 4001, 400b can be fixed along the tube of the bicycle; one end of the oil tubes 400a, 400b are connected with the guiding members 410a, 410b, and the other end of the oil tubes 400a, 400b are connected with the disc brake units 500a, 500b.

The two disc brake units 500a, 500b are connected with the oil tubes 400a, 400b, and the disc brake units 500a, 500b are controlled by the pressure of the oil tubes 400a, 400b. The disc brake units 500a, 500b are located n the front wheel and the rear wheel respectively to control the rotation of the wheels.

The extension direction of the body tube 110 towards the X axis direction, and the extension direction of the body tube 110 is parallel to the moving direction of the activating member 220. In details, when a brake is performed, the activating member 330 of the hydraulic unit 300a is moved toward the positive-X axis direction, and the activating member 330 of the hydraulic unit 300b is moved toward the negative-X direction. The moving direction of the bicycle is toward the Y axis direction, and the extension direction of the stem 120 also towards the Y axis direction. The extension direction of the oil tubes 400a, 400b toward the Z axis direction. In other word the oil tubes 400a, 400b are faced toward the ground, therefore it is favorable for connecting the disc brake units 500a, 500b on the wheels. Furthermore, the height of the activating member 330 of the hydraulic unit 300a and the height of the activating member 330 of the hydraulic unit 300b are different in the Z axis direction. In other word, the position of the hydraulic unit 300a is higher than the position of the hydraulic unit 300b in the Z axis direction. The two hydraulic units 300a, 300b are located in the top and bottom sides respectively and are close to the proximal end 210 of the cover 200; through this kind of structure, the volume and weight of the cover 200 can be dramatically reduced, and the hydraulic cylinder 310 can be activated through simple mechanical structures. The moving direction of the activating member 330 of the hydraulic unit 300a and the moving direction of the activating member 330 of the hydraulic unit 300b are opposite, thus it is favorable for repairing and wire routing, and the cost on assembling, dismantling or repairing the hydraulic disc brake device 100 for a bicycle can be reduced.

In FIGS. 4 to 5C, a plurality of holes wilt be formed during the manufacturing process of the accommodating spaces 230a, 230b, the oil routes 240a, 240b and the oil sump 250a. In order to flow the oil in an enclosed space, the holes must be sealed. In the embodiment, five sealing members are used: a first sealing member 610, a second sealing member 620, a third sealing member 630, two fourth sealing members 640 and a fifth sealing member 650. The first sealing member 610 is used to seal the corresponding hole to prevent the leakage of the oil in the oil route 240a, thus the hydraulic unit 300a in the accommodating space 230a can be operated normally. Similarly, the second sealing member 620 is used to seal the corresponding hole to prevent the leakage of the oil in the oil route 240b, thus the hydraulic unit 300b in the accommodating space 230b can be operated normally. The third sealing member 630b is used to seal the corresponding hole to prevent the leakage of the oil in the oil sump 250b. The two fourth sealing members 640 are used to seal the oil injection hole of the oil sumps 250a, 250b respectively. When the oil is injected to the sumps 250a, 250b through the injection hole, the two fourth sealing members 640 can seal the oil injection hole to prevent the leakage of the oil from the oil sumps 250a, 250b. The fifth sealing member 650 is used to seal an air vent on the cover 200. The air vent is located on the top side of the cover 200 to vent the unnecessary gas in the oil to prevent unwanted influence on the brake effect. After the gas is vented, the fifth sealing member 650 can be used to seal the air vent to isolate the outer gas.

Figure 8A:
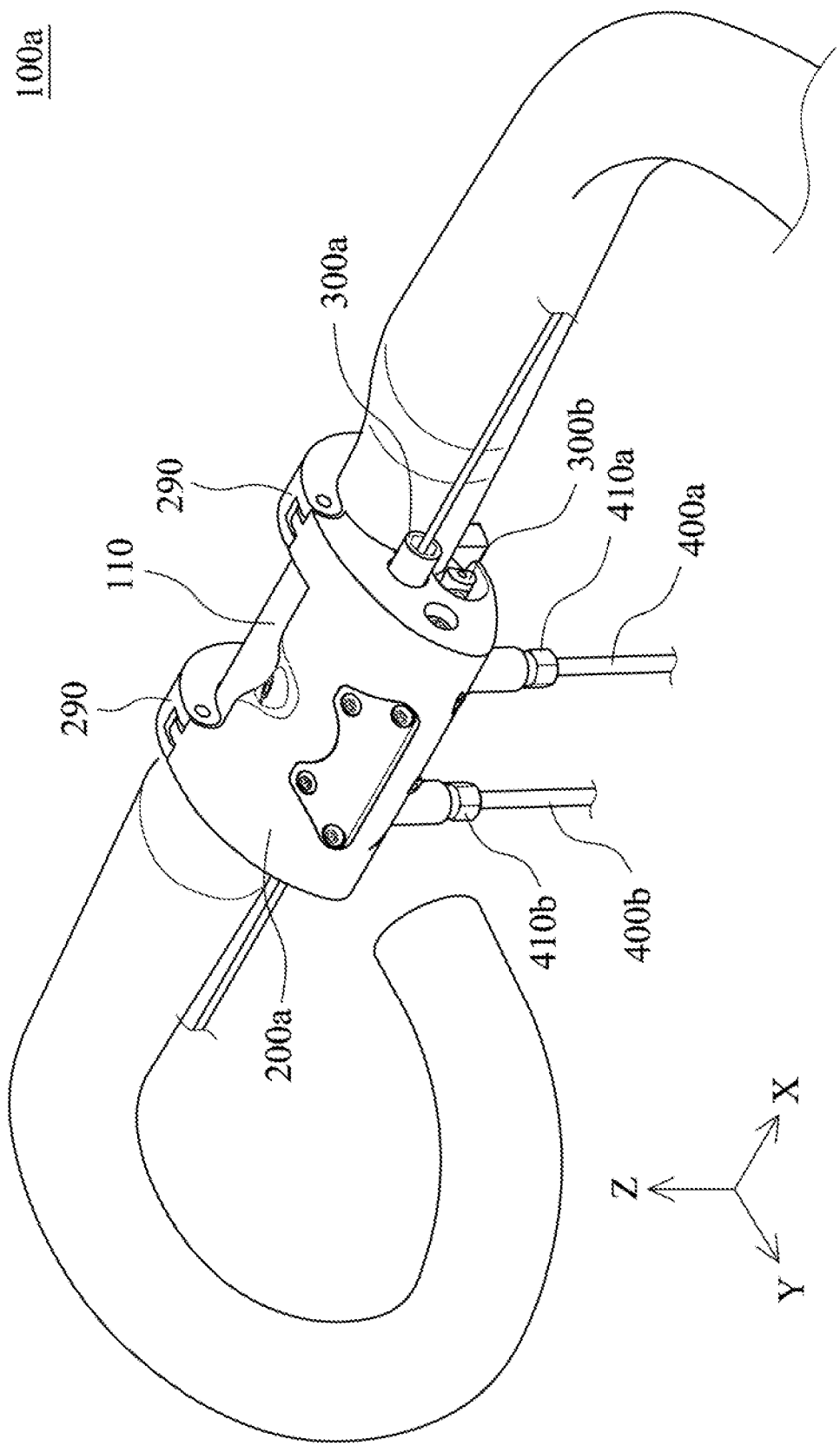
FIG. 8A is a schematic view showing that a hydraulic disc brake device for a bicycle assembled with a stem according to another embodiment of the present disclosure.

FIG. 8A is a schematic view showing that a hydraulic disc brake device 100a for a bicycle assembled with the body tube 110 according to another embodiment of the present disclosure; FIG. 8B is a side view of FIG. 8A. The body tube 110 is a handle bar, and the a hydraulic disc brake device 100a for a bicycle includes a cover 200a, two hydraulic units 300a, 300b, two oil tubes 400a, 400b and disc brake units (not shown).

In FIG. 8A, the two hydraulic units 300a, 300b and the two oil tubes 400a, 400b have similar structures as those in FIG. 1, and the disc brake units (not shown) of the a hydraulic disc brake device 100a for a bicycle have similar structures as the disc brake units 500a, 500b in FIG. 3. The cover 200a in FIG. 8A has a particular shape. The cover 200a includes two trunnions 290 surrounding locks the body tube 110. The cover 200a is fixed in a central position of the body tube 110. The trunnion 290 is annular shaped and a shape of the trunnion 290 is corresponding to a shape of the body tube 110. Therefore, the cover 200a can be tightly connected with the body tube 110 through the trunnion 290. Since the handle bar and the cover 200a are overlapped in the Y axis direction. When the bicycle is moving, the area of the windward surface can be reduced, and the aerodynamically shaped cover 200a can further reduce the windage.

Figure 9:
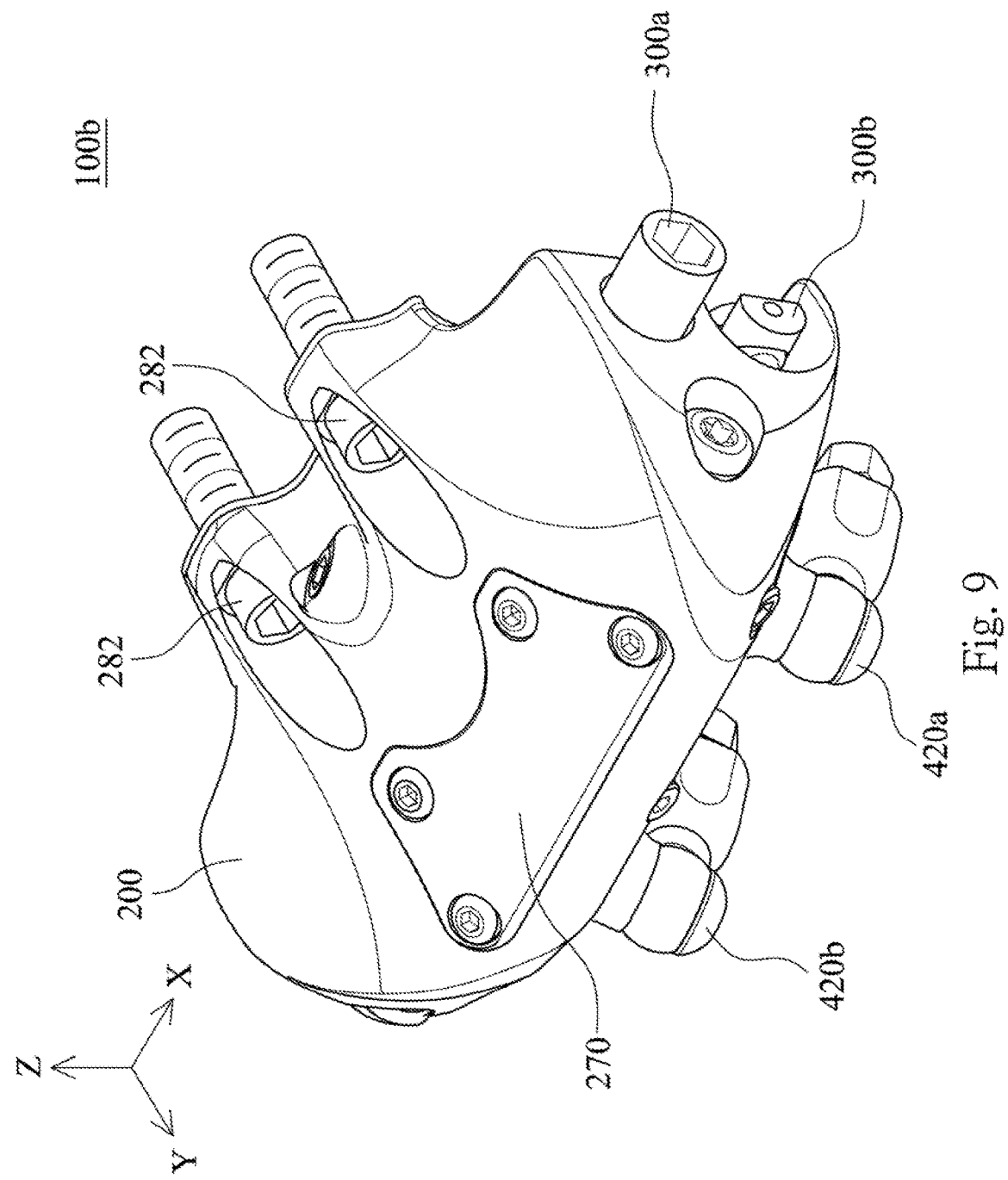
FIG. 9 is a schematic view showing a hydraulic disc brake device for a bicycle according to one embodiment of the present disclosure.

FIG. 9 is a schematic view showing a hydraulic disc brake device 100b for a bicycle according to one embodiment of the present disclosure. In FIG. 9, the guiding members 420a, 420b is L shaped; the shape of the inlet of the guiding members 420a, 420b are corresponding to the shape of the cover 200 and toward the negative-Y axis direction and the negative-Z axis direction. Therefore, the oil tubes 400a, 400b are connected with the tube of the bicycle frame along the direction of the inlet of the guiding members 420a, 420b.

This structure is favorable for routing the oil tubes 420a, 420b and can reduce the sway of the oil tubes 420a, 420b caused by the wind flow.

Figure 10:
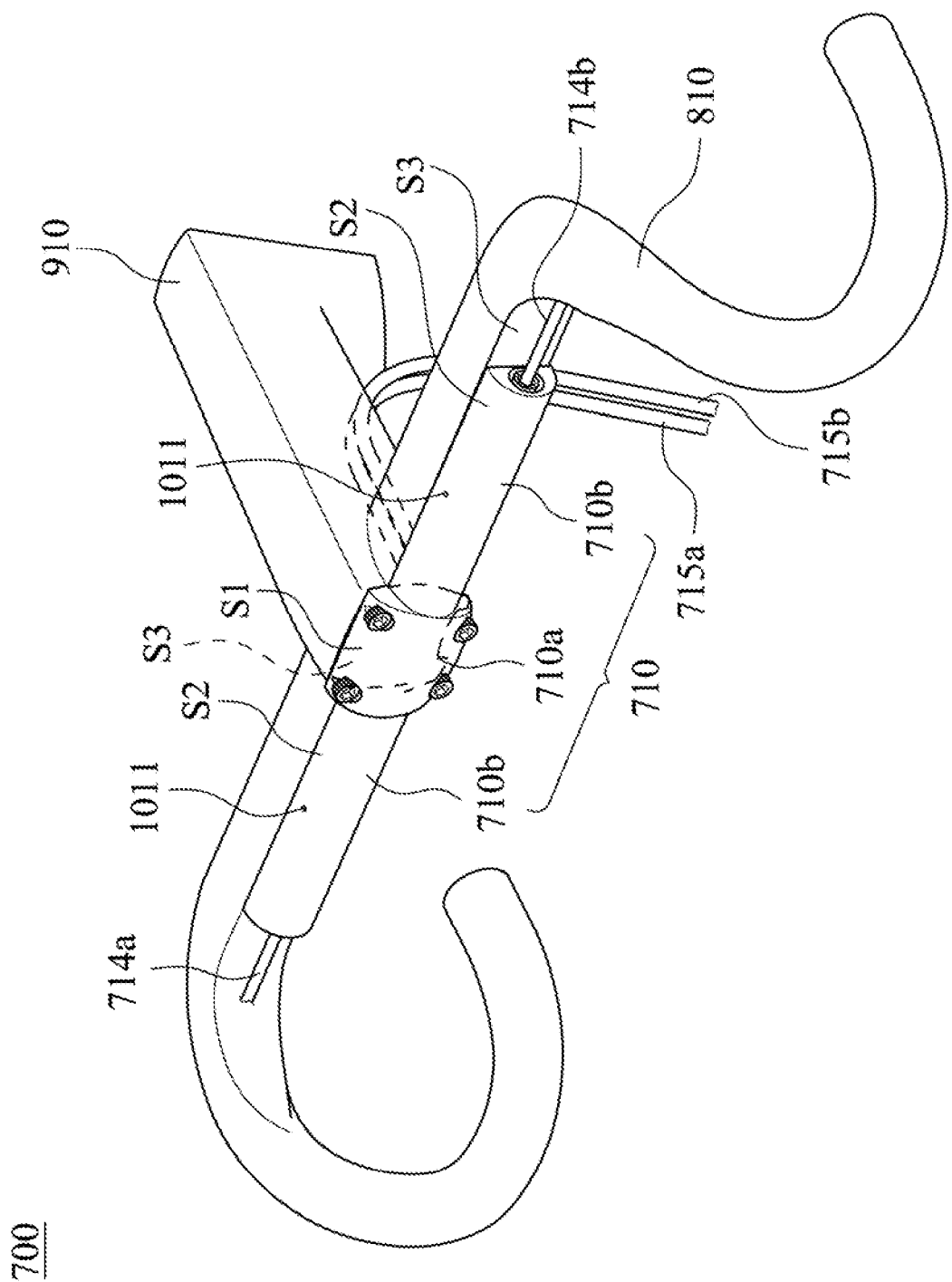
FIG. 10 is a schematic view showing a hydraulic disc brake device for a bicycle according to one embodiment of the present disclosure.
Figure 11:
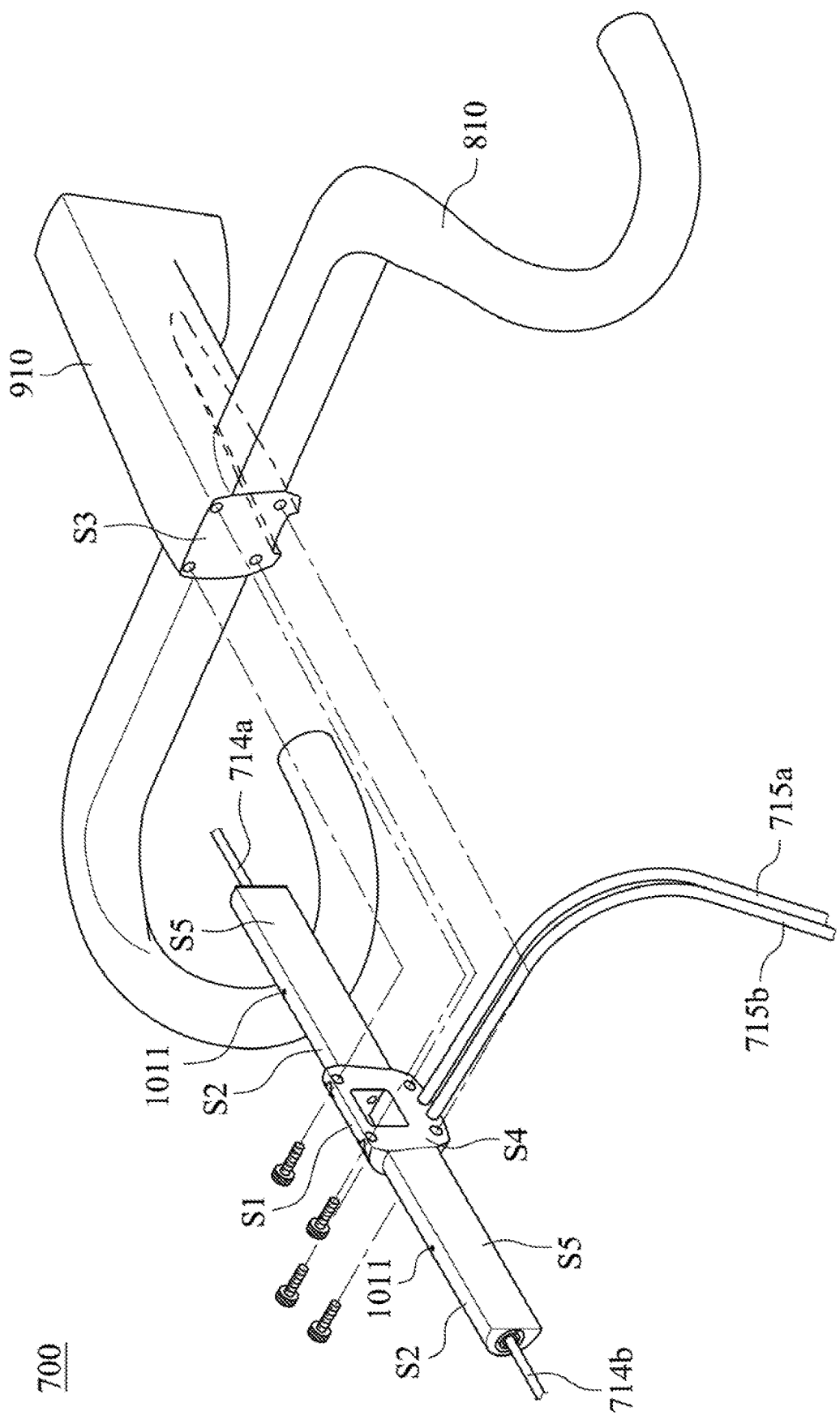
FIG. 11 is a schematic view showing that the hydraulic disc brake device for a bicycle in FIG. 10 assembled with a body tube.
Figure 12:
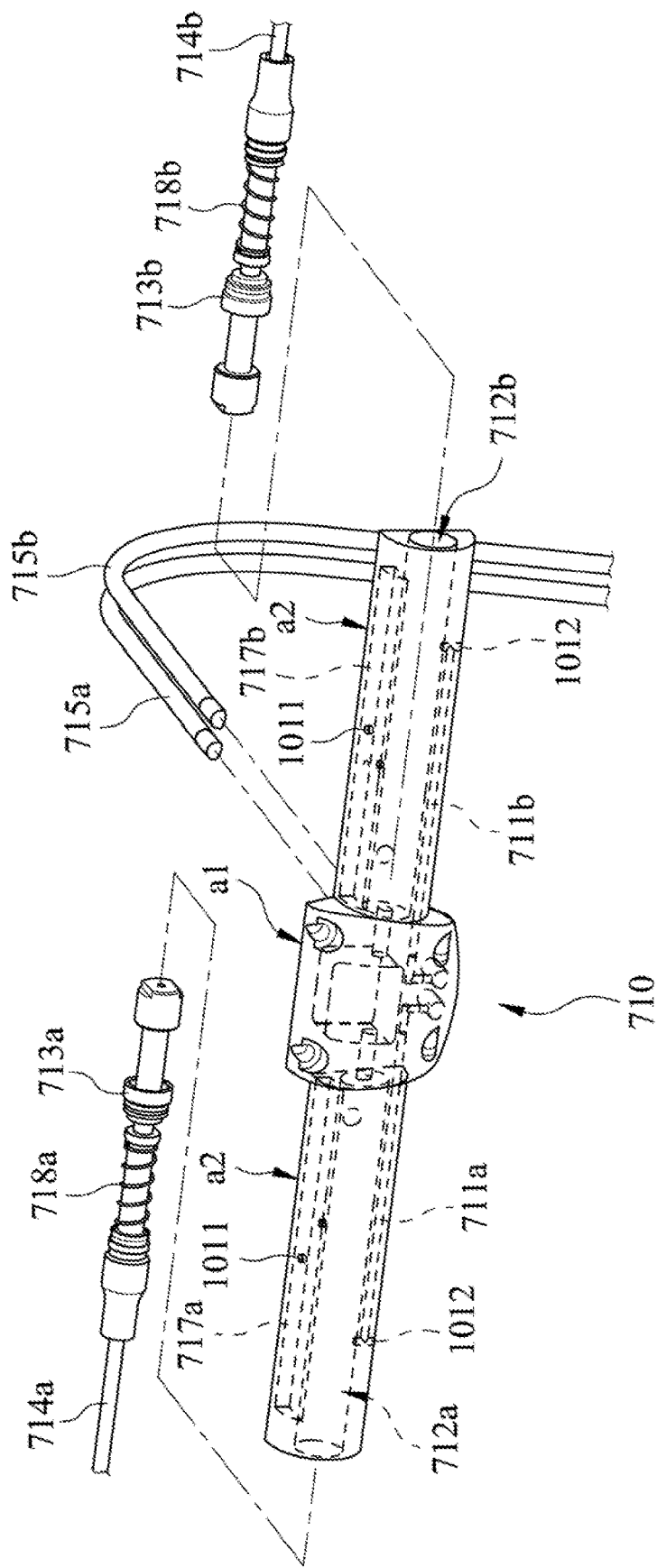
FIG. 12 is a schematic view showing that the piston assembled with the oil tube of the hydraulic disc brake device for a bicycle in FIG. 10.
Figure 13:
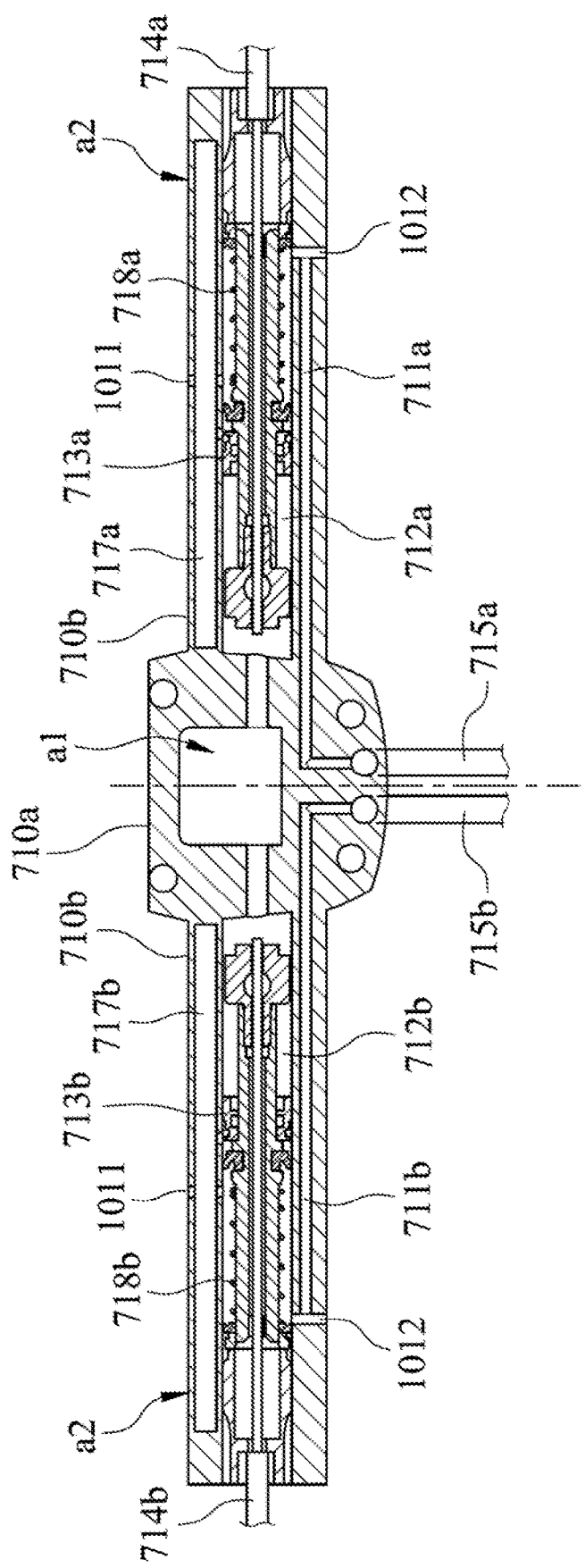
FIG. 13 is a cross-sectional view showing the hydraulic disc brake device for a bicycle of FIG. 10.
Figure 14:
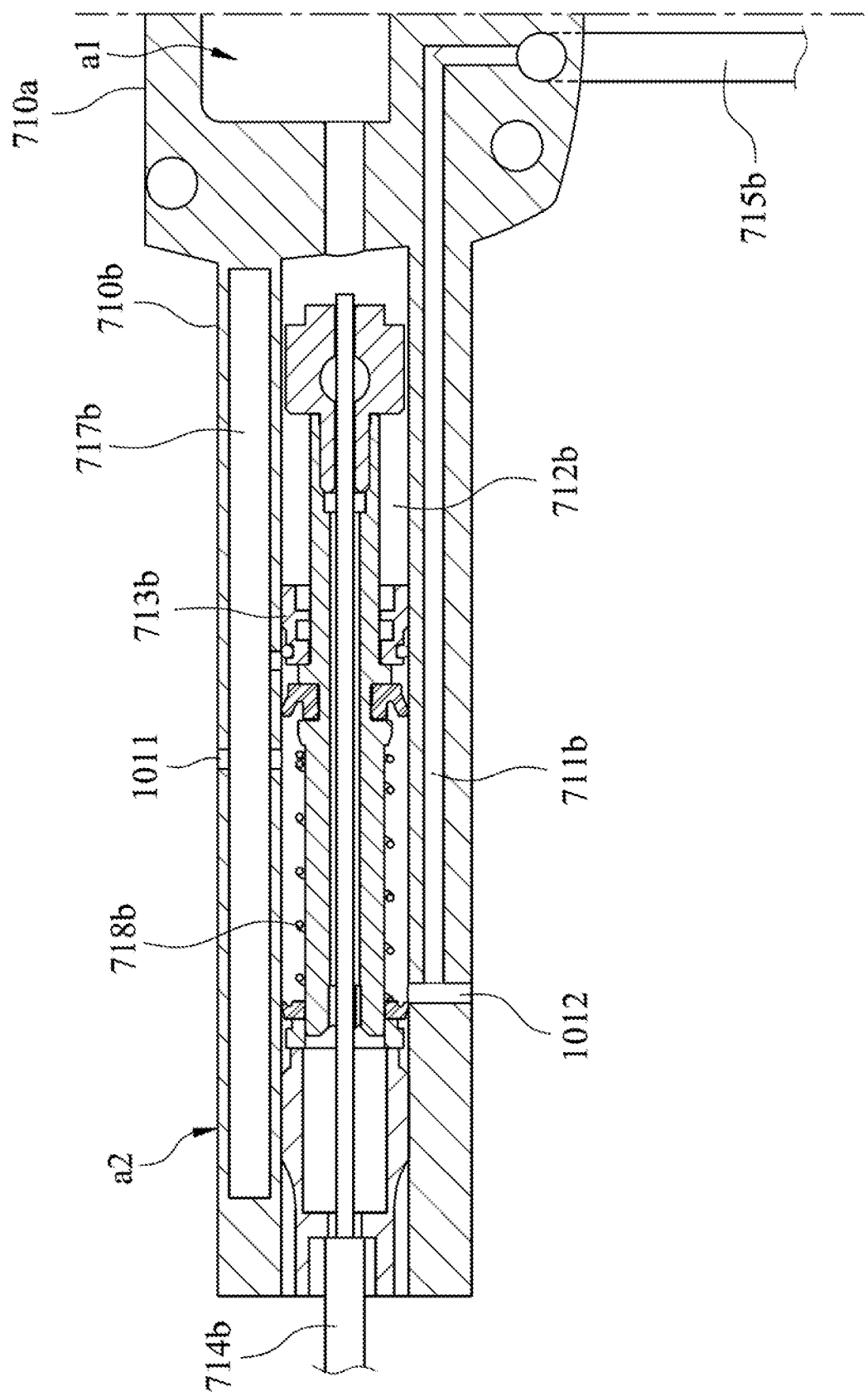
FIG. 14 is a partially-enlarged view showing the hydraulic disc brake device for a bicycle of FIG. 13.
Figure 15:
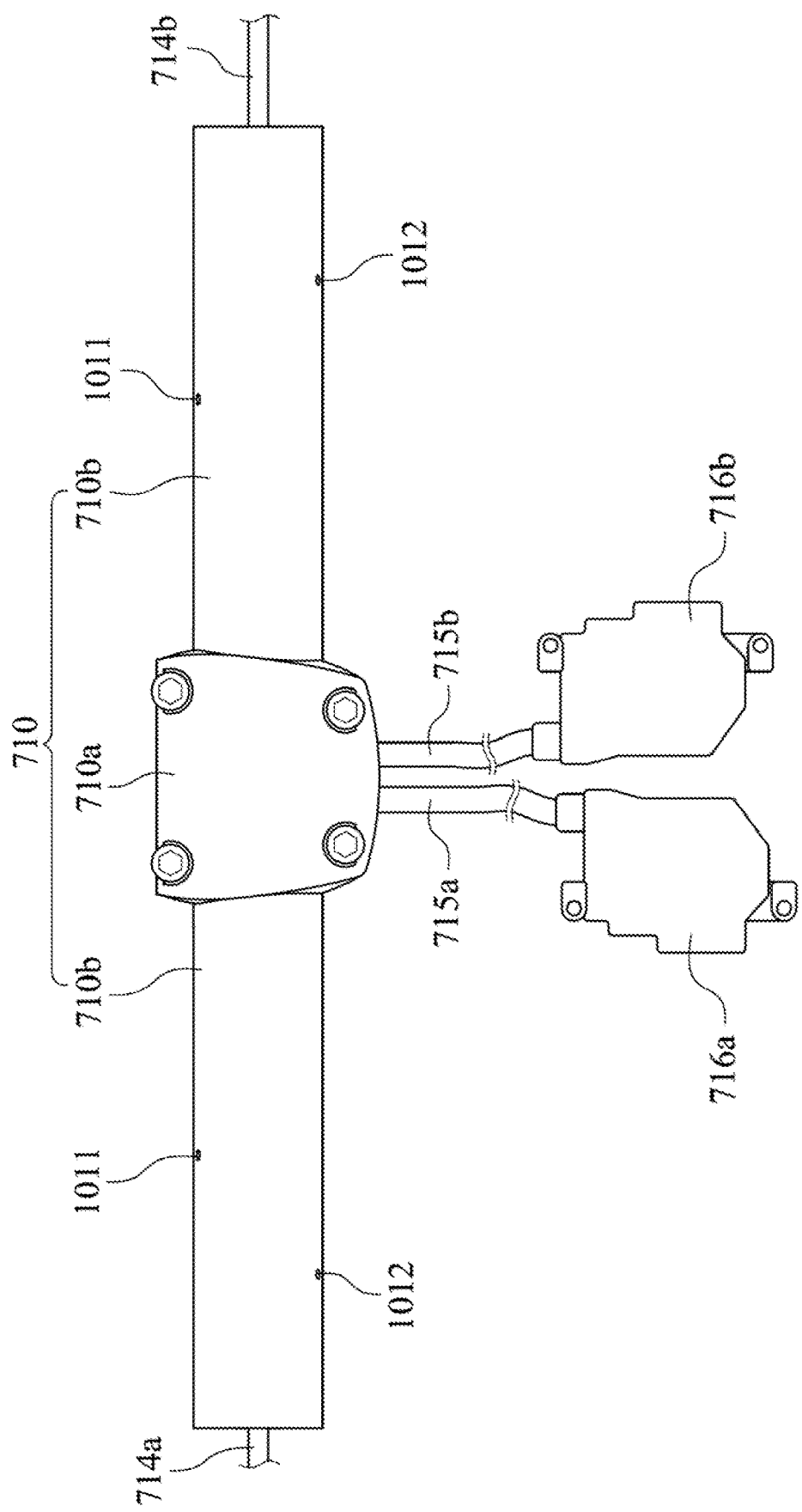
FIG. 15 is a schematic view showing the assembling of the disc brake unit of FIG. 10.
Figure 16:
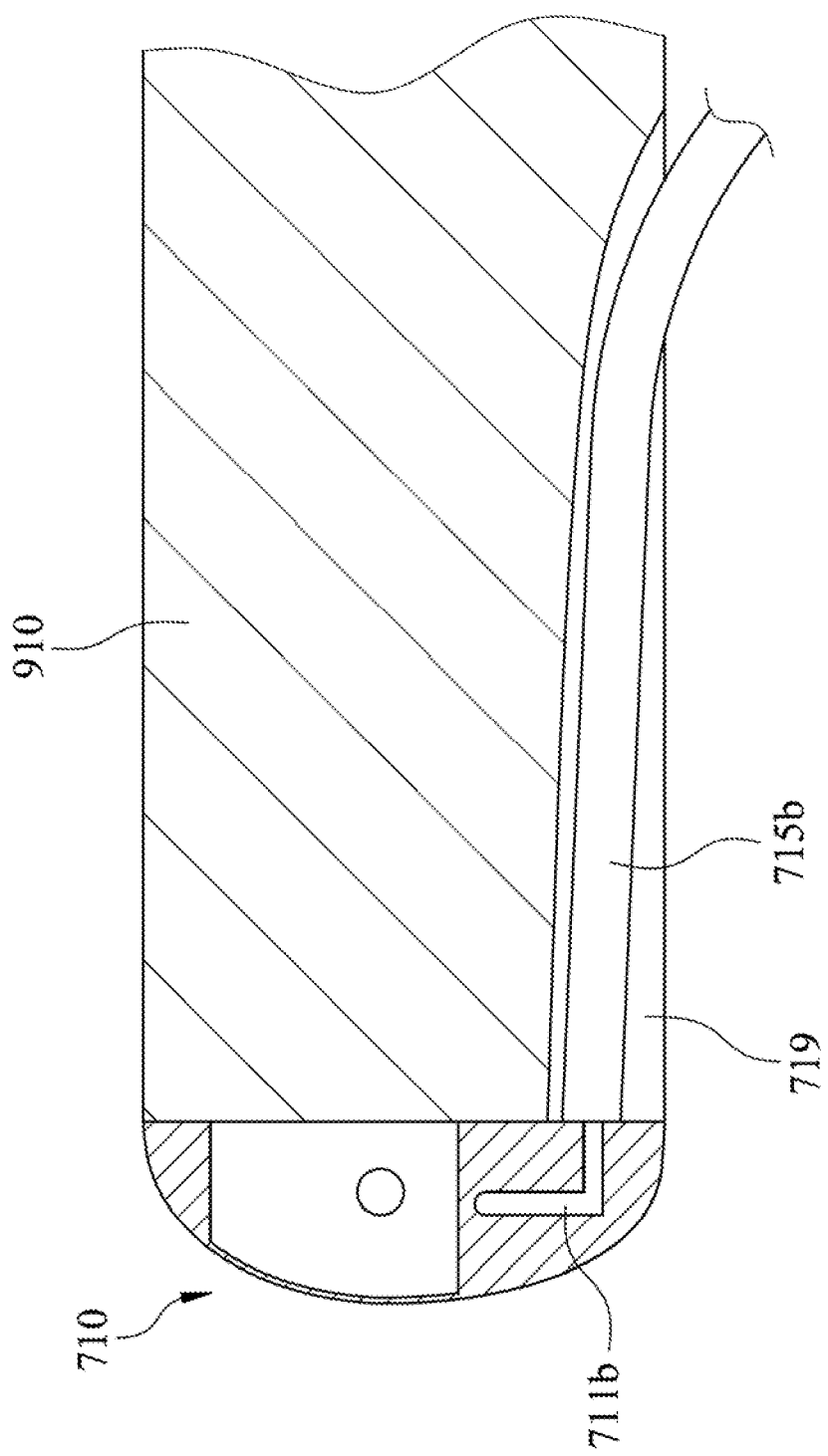
FIG. 16 is a schematic view showing the assembling of the oil tube of the hydraulic disc brake device of FIG. 10.

FIG. 10 is a schematic view showing a hydraulic disc brake device 700 for a cycle according to one embodiment of the present disclosure; FIG. 11 is a schematic view showing that the hydraulic disc brake device 700 for a bicycle in FIG. 10 assembled with a body tube 910; FIG. 12 is a schematic view showing that the pistons 713a, 713b assembled with the oil tubes 715a, 715b of the hydraulic disc brake device 700 for a bicycle in FIG. 10; FIG. 13 is a cross-sectional view showing the hydraulic disc brake device 700 for a bicycle of FIG. 10; FIG. 14 is a partially-enlarged view showing the hydraulic disc brake device 700 for a bicycle of FIG. 13; FIG. 15 is a schematic view showing the assembling of the disc brake units 716a, 716b of the hydraulic disc brake device 700 for a bicycle in FIG. 10; FIG. 16 is a schematic view showing the assembling of the oil tubes 715a, 715b of the hydraulic disc brake device 700 for a bicycle of FIG. 10.

In the following embodiments, the body tube 910 is a stem, and two handle bars 210 are assembled on the left and right sides of the body tube 910 respectively. The hydraulic disc brake device 700 is partially corresponding to the position of the two handle bars 810, more details are described in the follow paragraphs. In one embodiment, the hydraulic disc brake device 700 at least includes a cover 710, an oil route 711a, a hydraulic cylinder 712a, a piston 713a, an activating member 714a, an oil tube 715a, a disc brake unit 716a and an oil sump 717a. In a preferred embodiment, the hydraulic disc brake device 700 includes two oil routes 711a, 711b, two hydraulic cylinders 712a, 712b, two pistons 713a, 713b, two activating members 714a, 714b, two oil tubes 715a, 715b, two disc brake units 716a, 716b and two oil sumps 717a, 717b. Therefore, in the following embodiments, the hydraulic disc brake device 700 can be used to both control the front wheel and the real wheel of the bicycle.

The cover 710 is used to accommodate the components of the hydraulic disc brake device 700; therefore the components can be hidden and protected as well as reducing the windage. The cover 710 includes a connection portion 710a and two extension portions 710b. The connection portion 710a is detachably connected with the body tube 910. In other word, the cover 710 is fixed to the body tube 910 through the connection portion 710a. In the embodiment, the cover 710 is screwed to the body tube 910. However, there are no limitations on the structure for fixing the cover 710 to the body tube 910; other possible fixing structures may be used. The extension portions 710b are symmetrically arranged about the connection portion 710a, and the two extension portions 710b are corresponding to the position of each of the handle bars 810. Owing to the symmetry structure, the relative positions of the components may be described using single side in the following paragraphs.

In an embodiment, the two extension portions 710b are connected at the left and right sides of the connection portion 710a respectively; in another embodiment, the two extension portions 710b and the connection portion 710a are integratedly formed to construct the cover 710. For accommodating the components that achieve the hydraulic brake effect, an accommodating space a2 is formed in each of the extension portion 710b. Furthermore, an accommodating space a1 is formed in the connection portion 710a.

When assembling the hydraulic disc brake device 700 to a bicycle, the two handle bars 810 are assembled with the body tube 910 and then the hydraulic disc brake device 708 is assembled with the handle bar 810 or the body tube 910. In FIGS. 12 to 14, each of the oil sumps 717a, 717b, each of the hydraulic cylinders 712a, 712b and each of the oil tubes 711a, 711b are assembled in the accommodating space a2 of each of the extension portion 710b from top to bottom. Therefore, the volume of the device can be reduced, thus it is favorable for assembling, repairing or dismantling.

The two pistons 713a, 713b are assembled in the hydraulic cylinders 712a, 712b respectively, and the pistons 713a, 713b are used to control the pressure of the oil routes 711a, 711b. The two activating members 714a, 714b can be two brake cables, and are used to activate the pistons 713a, 713b for performing a brake. The two oil tubes 715a, 715b are connected with the two oil routes 711a, 711b respectively. The two disc brake units 716a, 716b are connected with the oil tubes 715a, 715b respectively, and each of the disc brake units 716a, 716b is controlled by the pressure of each of the oil tubes 715a, 715b. The oil sumps 717a, 717b are connected with the hydraulic cylinders 712a, 712b respectively.

In FIG. 14, the hydraulic brake mechanism of the present disclosure is shown. When performing a brake, the activating member 714b moves and activates the piston 713b to compress the spring 718b, at the time, the oil in the oil route 711b and the oil sump 717b is pressured and activates the disc brake unit 716b through the oil tube 715b to resist the rotation of the wheel; on the contrary, in a normal situation, the spring 718b resists the piston 713b to release the pressure of the oil in the oil route 711b, thus the wheel can rotate normally. For both controlling the front wheel and the real wheel, the two pistons 713a, 713b and the two activating members 714a, 714b are controlled by the left and right hands of the user respectively. The moving direction of the activating members 714a, 714b are parallel to the handle bars 210, thus it is favorable for routing and repairing. The disc brake units 716a, 716b are assembled in the front wheel and the rear wheel respectively, or the disc brake units 716a, 716b are assembled in the rear wheel and the front wheel respectively.

In the present disclosure, the routing of the wires and the components are hidden by the cover 710 for achieving a protective effect and an attractive appearance. Furthermore, the structure of the cover 710 can also contribute to reduce the windage while riding the bicycle.

The connection portion 710a includes a front surface S1 and a rear surface S4, each of the extension portions 710b includes a front surface S2 and a rear surface S6. The front surface S1 of the connection portion 710a and the front surface S2 of each of the extension portions 710b can be a curve, and the rear surface S4 of the connection portion 710a and the rear surface S5 of each of the extension portions 710b can be a plane. The body tube 910 also includes a front surface S3, and the cover 710 is assembled with the front surface S3. The front surface S1 of the connection portion 710a of the cover 710 and the front surface S2 of each of the extension portions 710b of the cover 710 toward the moving direction of the bicycle. Therefore, the structure is simple and the curved front surfaces S1, S2 can reduce the windage effectively.

Figure 17:
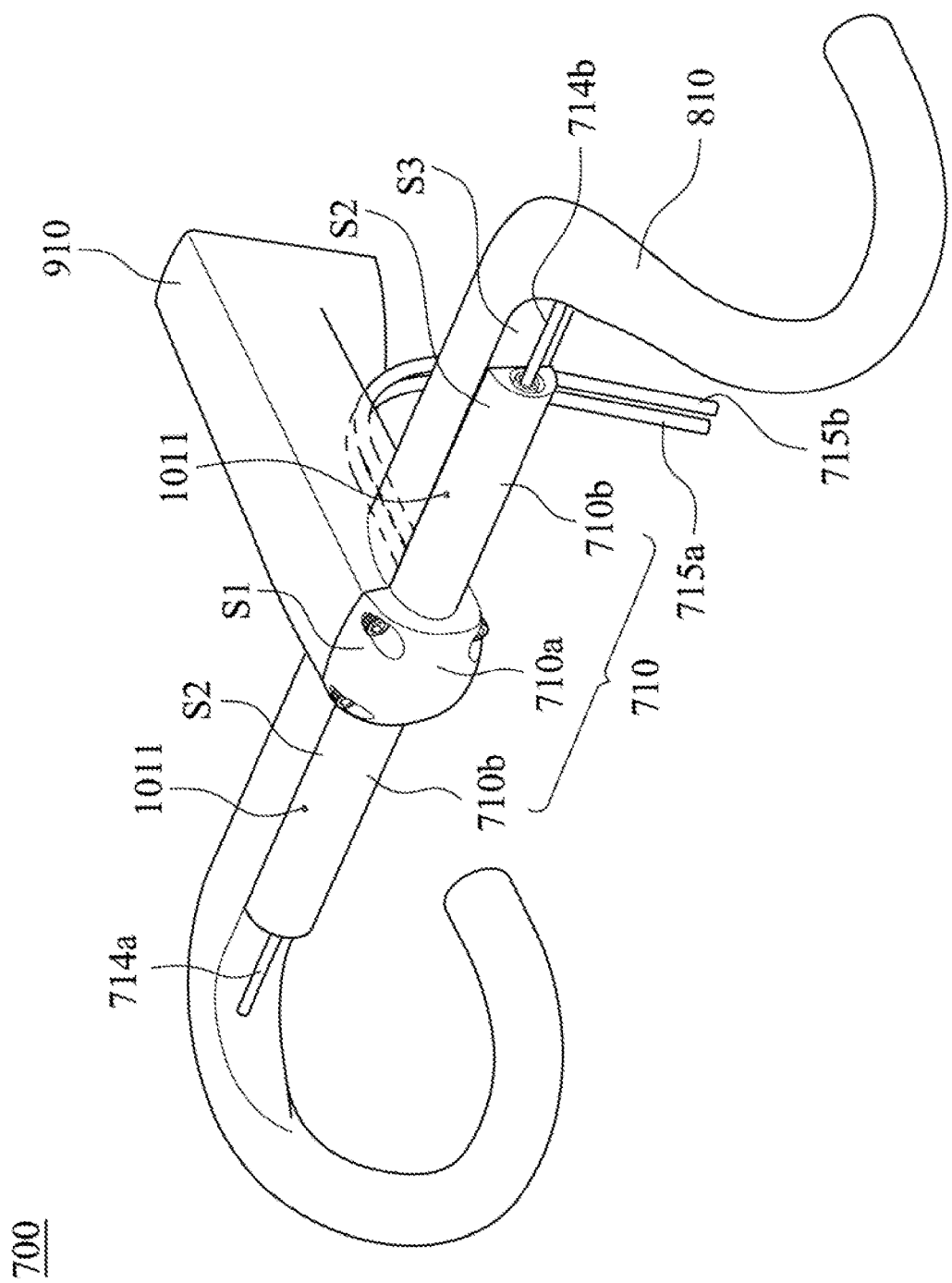
FIG. 17 is another example of the cover of the hydraulic disc brake device of FIG. 10.

FIG. 17 is another example of the cover 710 of the hydraulic disc brake device 700 of FIG. 10. In FIG. 17, the distance between the front surface S1 of the connect on portion 710a and the handle bar 210 is the same as the distance between the front surface S2 of each of the extension portions 710b and the handle bar 810. In other word, the radian of the front surface S1 of the connection portion 710a is the same as the radian of the front surface S2 of each of the extension portions 710b. Therefore, adjusting different radians of the front surfaces S1, S2 can produce a different windage coefficient. In the aforementioned embodiments (i.e. FIGS. 10 to 16), the distance between the front surface S1 of the connection portion 710a and the handle bar 810 is different from the distance between the front surface S2 of each of the extension portions 710b and the handle bar 810. In other word, the radian of the front surface S1 of the connection portion 710a is different from the radian of the front surface S2 of each of the extension portions 710b. Therefore, adjusting the front surface S1 to align with the front surface S2 is favorable for reducing the volume of the cover 710 and adjusting the windage. Moreover, it is also favorable for increasing the convenience of assembling and lowering the manufacturing cost.

For hiding and accommodating the wires, a groove 719 is formed under the body tube 910. Each of the oil routes 711a, 711b is extended to the connection portion 710a and is exposed out. Each of the oil tubes 715a, 715b is connected with each of the oil routes 711a, 711b and is accommodated in the groove 719. The extension direction of each of the oil tubes 715a, 715b is parallel and opposite to the moving direction of the bicycle. Therefore, adjusting the extension directions of the oil tubes 715a, 715b can smoothly route the wires and is favorable for repairing and dismantling the components.

From the aforementioned embodiments, in the hydraulic disc brake device 700, no components are located in the connection portion 710a of the cover 710, therefore the space utilization can reach a maximum value, the weight of the whole device can be reduced and the manufacturing cost can be reduced as well. Furthermore, the simple structure and the aerodynamically shaped cover 710 can also reduce the windage.

A plurality of holes will be formed during the manufacturing process of the cover 710 in order to fill the oil or vent the gas. For example, the hole 1011 is used to fill the oil, and the hole 1012 is used to vent unnecessary gas in the oil to prevent unwanted influence on the brake effect. The holes 1011, 1012 must be sealed to prevent the leakage of the oil. In one example, sealing members can be used to seal the holes 1011, 1012. The sealing members can be screwed.

Figure 18:
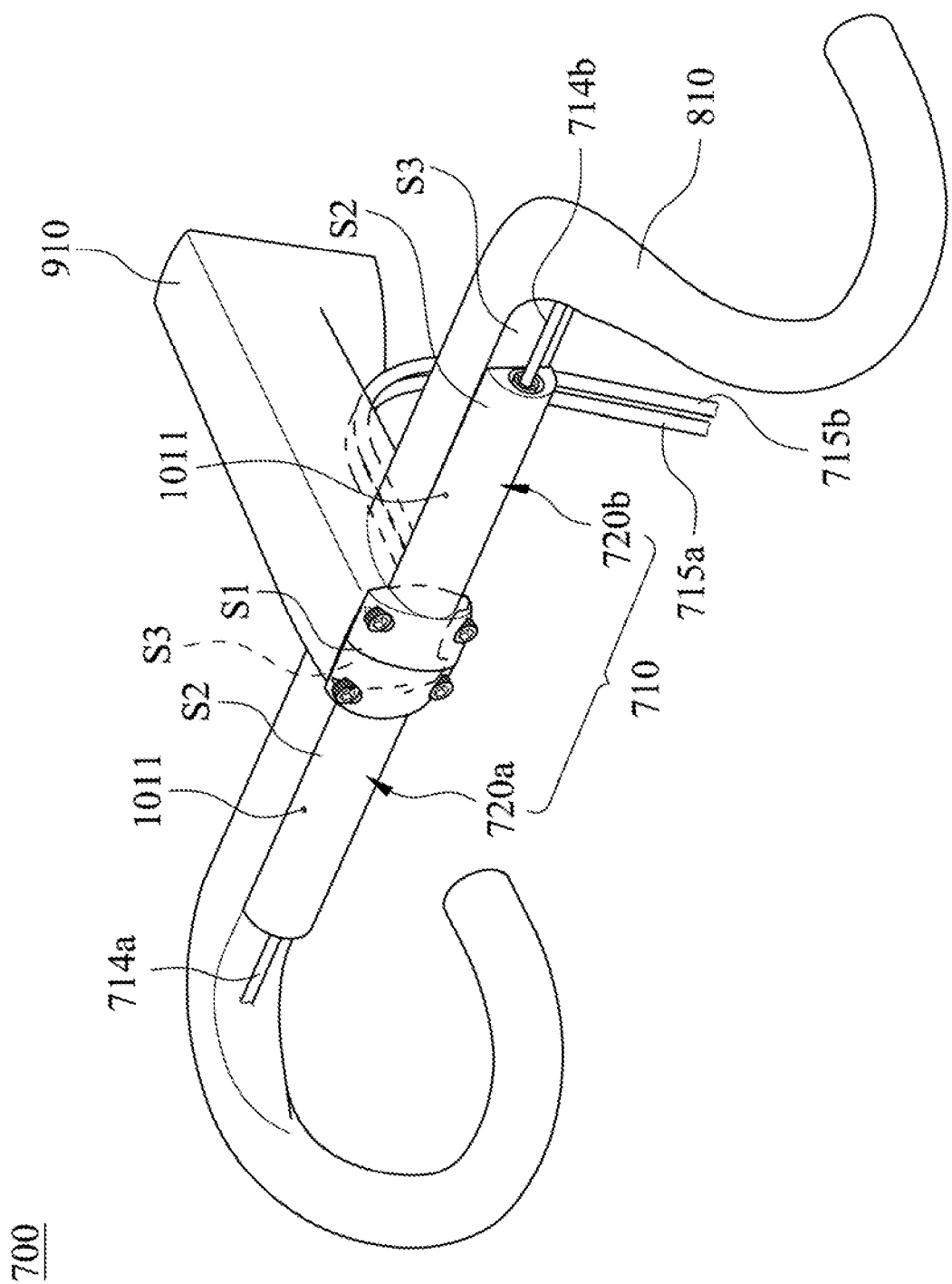
FIG. 18 is a schematic view showing the assembling of the cover and the body tube according to one embodiment of the present disclosure.
Figure 19:
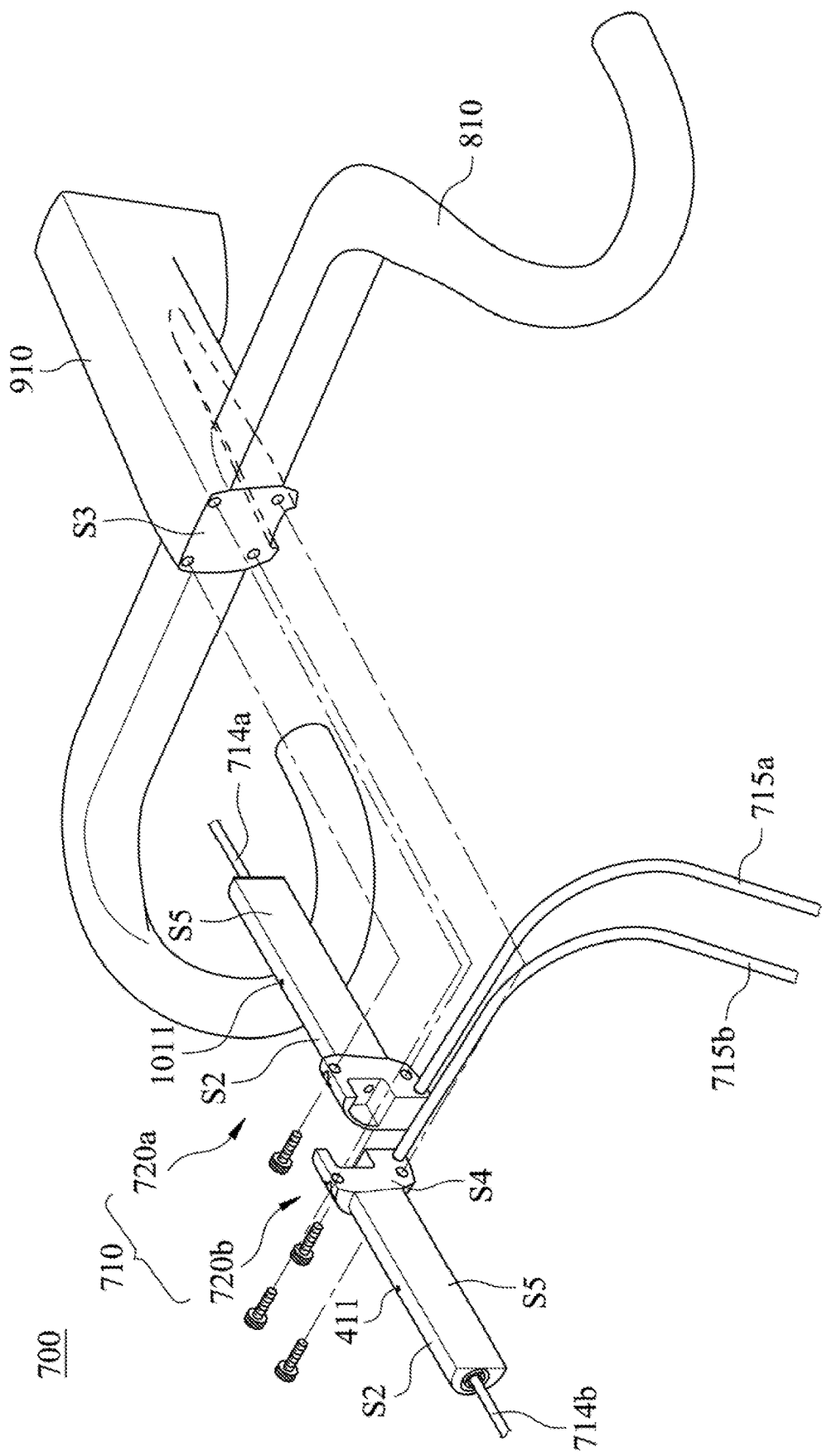
FIG. 19 is a schematic showing the structure of the cover of FIG. 18.

FIG. 18 is a schematic view showing the assembling of the cover 710 and the body tube 910 according to one embodiment of the present disclosure; and FIG. 19 is a schematic showing the structure of the cover 710 of FIG. 18. In FIG. 18, the cover 710 is separated into a first joint portion 720a and a second joint portion 720b. The first joint portion 720a and the second joint portion 720b are screwed to the body tube (stem) 910, thereby fixing the cover 710 to the body tube 910. The first joint portion 720a and the second joint portion 720b are correspondingly located at the front side of each of the handle bars 810. The cover 710 in FIG. 18 can be also viewed as that the connection portion 710a of the cover 710 in FIG. 10 is separated into two symmetry parts; each part of the connection portion 710a of the cover 710 is integratedly connected with one of the extension portions 710b, thereby forming the two joint portions 720a, 720b.

In sum, the present disclosure has the advantages as follows: (a) the hydraulic unit is controlled by the activating members having parallel and opposite moving directions, thereby achieving simple structure and light weight; (b) the hydraulic disc brake device is integratedly assembled in the front of the handle bars, and the hydraulic disc brake device is parallel and overlapped to the windward surface of the body tube, therefore the area of the windward surface can be reduced, and the aerodynamically shaped cover can reduce the windage; (c) the arrangement of the components of the hydraulic brake device increases the space utilization and the length of the cover towards the moving direction can be reduced, thereby reducing the volume as well as the weight of the device; (d) the moving direction of the activating members is parallel to the body tube, thus it is favorable for repairing and wire routing.

Although the present disclosure has been described in considerable detail with reference to certain embodiments thereof, other embodiments are possible. Therefore, the spirit and scope of the appended claims should not be limited to the description of the embodiments contained herein.

It will be apparent to those skilled in the art that various modifications and variations can be made to the structure of the present disclosure without departing from the scope or spirit of the disclosure. In view of the foregoing, it is intended that the present disclosure cover modifications and variations of this disclosure provided they fall within the scope of the following claims.

What is claimed is:

1. A hydraulic disc brake device for a bicycle, the hydraulic disc brake device is assembled on a handle bar of the bicycle, the hydraulic disc brake device comprising:
   a cover comprising at least one accommodating space, at least one oil route, a proximal end and a distal end, wherein the cover is aerodynamically shaped, the proximal end is detachably assembled on the handle bar, and the distal end towards to a moving direction of the bicycle;
   a hydraulic unit assembled in the accommodating space and entirely enclosed by the cover, the hydraulic unit comprising:
      a hydraulic cylinder assembled in the accommodating space, wherein the hydraulic cylinder is located in front of a moving direction of the handle bar; and
      a piston assembled in the hydraulic cylinder for controlling a pressure of the oil route;
   an oil tube connected with the oil route;
   a disc brake unit connected with the oil tube and controlled by a pressure of the oil tube; and
   a stem, wherein the proximal end is detachably assembled on the handle bar through the stem.

2. The hydraulic disc brake device of claim 1, wherein the cover comprises:
   at least one trunnion surroundingly locks the handle bar, the trunnion is annular shaped and a shape of the trunnion is corresponding to a shape of the handle bar.

3. The hydraulic disc brake device of claim 1, wherein the oil tube towards the ground, the bicycle is moved along a positive-Y axis direction, the handle bar is extended along a X axis direction, the proximal end towards a negative-Y axis direction, the distal end towards the positive-Y axis direction, and the hydraulic cylinder is located between the proximal end and the distal end.

4. The hydraulic disc brake device of claim 1, wherein the cover comprises:
   an oil hole located at the distal end of the cover and toward an upper direction of the distal end;
   an oil cap detachably covering the oil hole; and
   an oil sump assembled at the distal end and corresponding to the oil cap, the oil sump is connected with the hydraulic cylinder.

5. The hydraulic disc brake device of claim 1, wherein the cover comprises a length and a height, and the length is smaller than the height.

6. The hydraulic disc brake device of claim 1, wherein the accommodating space opens a hole outwardly, and the hydraulic unit comprises an activating member, the activating member passes through the hole and is connected with the piston for activating the piston for performing a brake.

7. The hydraulic disc brake device of claim 1, wherein the cover comprises at least two positioning holes and at least two positioning screws, the stem comprises at least two fixing holes, the two fixing holes are aligned with the two positioning holes, each of the positioning screws can move in one of the positioning holes and one of the fixing holes, and the cover is screwed and positioned through the two position screws.

* * * * *